US012574873B2

(12) United States Patent
Hu et al.

(10) Patent No.: US 12,574,873 B2
(45) Date of Patent: Mar. 10, 2026

(54) INITIAL ACCESS AND INITIAL BANDWIDTH PART CONFIGURATION FOR REDUCED CAPABILITY USER EQUIPMENTS

(71) Applicant: Samsung Electronics Co., Ltd., Suwon-si (KR)

(72) Inventors: Liang Hu, San Diego, CA (US); Jung Hyun Bae, San Diego, CA (US); Philippe Jean Marc Michel Sartori, Naperville, IL (US)

(73) Assignee: Samsung Electronics Co., Ltd., Suwon-si (KR)

( * ) Notice: Subject to any disclaimer, the term of this patent is extended or adjusted under 35 U.S.C. 154(b) by 407 days.

(21) Appl. No.: 18/160,992

(22) Filed: Jan. 27, 2023

(65) Prior Publication Data

US 2023/0276388 A1 Aug. 31, 2023

Related U.S. Application Data

(60) Provisional application No. 63/314,366, filed on Feb. 25, 2022.

(51) Int. Cl.
| | |
|---|---|
| *H04W 56/00* | (2009.01) |
| *H04L 27/26* | (2006.01) |
| *H04W 8/22* | (2009.01) |

(52) U.S. Cl.
CPC ... *H04W 56/0015* (2013.01); *H04L 27/26025* (2021.01); *H04W 8/22* (2013.01)

(58) Field of Classification Search
CPC ............... H04W 56/0015; H04W 8/22; H04L 27/26025
See application file for complete search history.

(56) References Cited

U.S. PATENT DOCUMENTS

| | | |
|---|---|---|
| 2018/0367386 A1 | 12/2018 | Liao |
| 2019/0090210 A1* | 3/2019 | Islam .................... H04W 72/30 |
| 2019/0132170 A1* | 5/2019 | Si ........................ H04W 56/001 |
| 2020/0266959 A1 | 8/2020 | Yi et al. |
| 2021/0211256 A1 | 7/2021 | Hwang et al. |
| 2021/0329718 A1 | 10/2021 | Hu et al. |
| 2021/0409184 A1 | 12/2021 | Yi et al. |
| 2024/0187037 A1* | 6/2024 | Liu ........................ H04B 1/713 |
| 2025/0097862 A1* | 3/2025 | Takahashi ............. H04W 72/20 |

* cited by examiner

*Primary Examiner* — Jackie Zuniga Abad
(74) *Attorney, Agent, or Firm* — Womble Bond Dickinson (US) LLP

(57) ABSTRACT

A method for performing an initial access process includes receiving, by a reduced capabilities (RedCap) user equipment (UE), a synchronization signal (SS)/physical broadcast channel (PBCH) block from a network. The SS/PBCH block may include a primary synchronization signal (PSS), a secondary synchronization signal (SSS), a first set of physical broadcast channels (PBCH), a second set of PBCH, and a third set of PBCH, wherein the third set of PBCH may be a duplicate of the second set of PBCH. The method may further include decoding, by the RedCap UE, the PSS, the SSS, the first set of PBCH, and the third set of PBCH.

21 Claims, 18 Drawing Sheets

RECEIVING, BY A REDUCED CAPABILITIES (REDCAP) USER EQUIPMENT (UE), A FIRST SYNCHRONIZATION SIGNAL (SS)/PHYSICAL BROADCAST CHANNEL (PBCH) BLOCK FROM A NETWORK; WHEREIN THE FIRST SS/PBCH BLOCK COMPRISES A PRIMARY SYNCHRONIZATION SIGNAL (PSS), A SECONDARY SYNCHRONIZATION SIGNAL (SSS), AND A PHYSICAL BROADCAST CHANNEL (PBCH); WHEREIN A SUBCARRIER SPACING (SCS) AND A NUMBER OF SUBCARRIERS USED BY THE FIRST SS/PBCH BLOCK CORRESPOND TO A PBCH BANDWIDTH THAT IS LESS THAN A MAXIMUM BANDWIDTH OF THE REDCAP UE /1702

DECODING, BY THE REDCAP UE, THE RECEIVED FIRST SS/PBCH CORRESPONDING TO THE MAXIMUM BANDWIDTH OF THE REDCAP UE /1704

Figure 13:
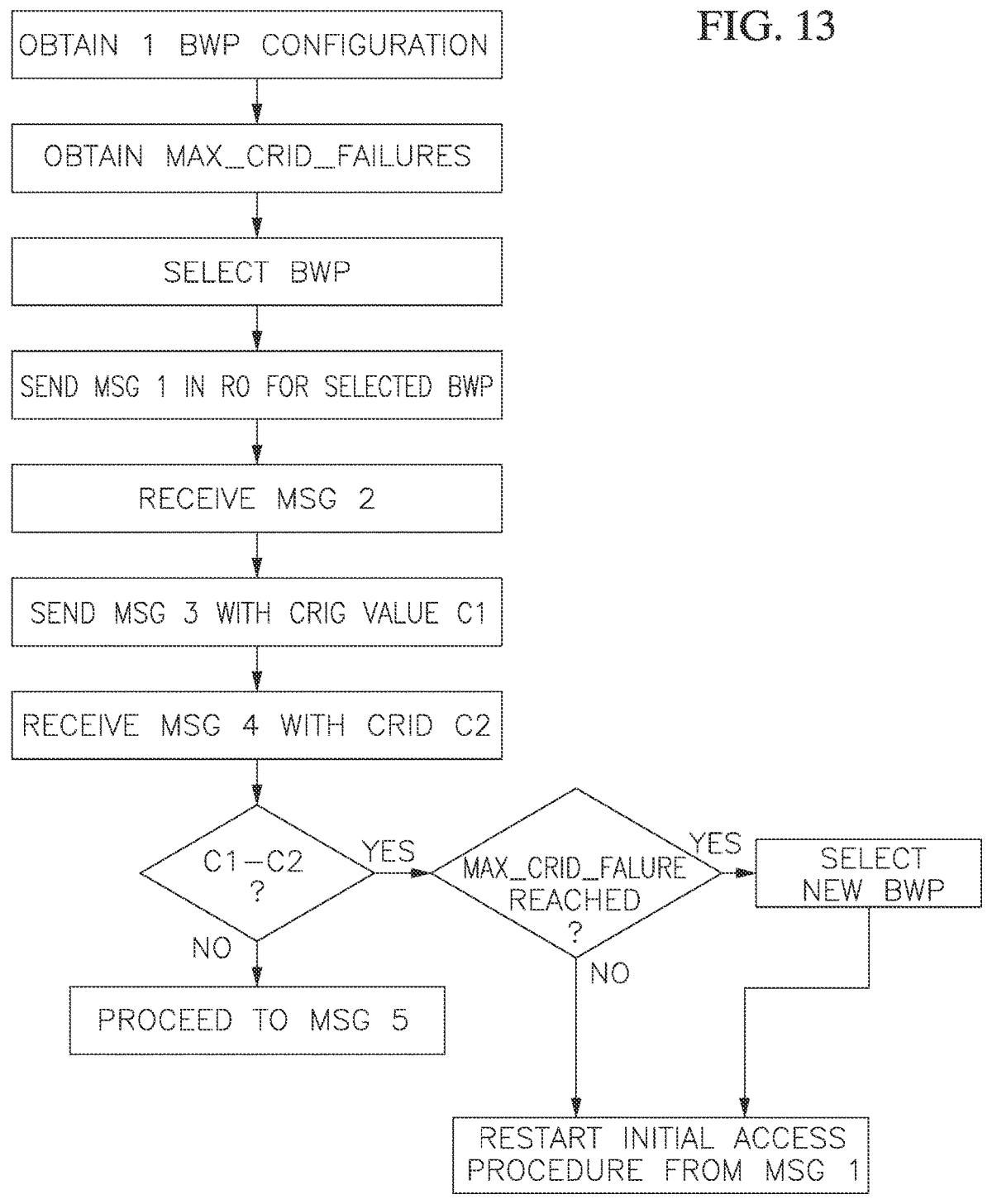

```
┌──────────────────────────────────┐
│   OBTAIN  1  BWP  CONFIGURATION   │
└──────────────────────────────────┘
                 │
                 ▼
┌──────────────────────────────────┐
│    OBTAIN  MAX_CRID_FAILURES      │
└──────────────────────────────────┘
                 │
                 ▼
┌──────────────────────────────────┐
│           SELECT  BWP             │
└──────────────────────────────────┘
                 │
                 ▼
┌──────────────────────────────────┐
│  SEND  MSG 1  IN  R0  FOR  SELECTED  BWP  │
└──────────────────────────────────┘
                 │
                 ▼
┌──────────────────────────────────┐
│         RECEIVE   MSG  2          │
└──────────────────────────────────┘
                 │
                 ▼
┌──────────────────────────────────┐
│  SEND  MSG  3  WITH  CRIG  VALUE  C1  │
└──────────────────────────────────┘
                 │
                 ▼
┌──────────────────────────────────┐
│  RECEIVE  MSG  4  WITH  CRID  C2  │
└──────────────────────────────────┘
```

Decision: $C1 = C2$? — YES → MAX_CRID_FALURE REACHED? — YES → SELECT NEW BWP $C1 = C2$? — NO → PROCEED TO MSG 5

MAX_CRID_FALURE REACHED? — NO → RESTART INITIAL ACCESS PROCEDURE FROM MSG 1

SELECT NEW BWP → RESTART INITIAL ACCESS PROCEDURE FROM MSG 1

FIG. 15

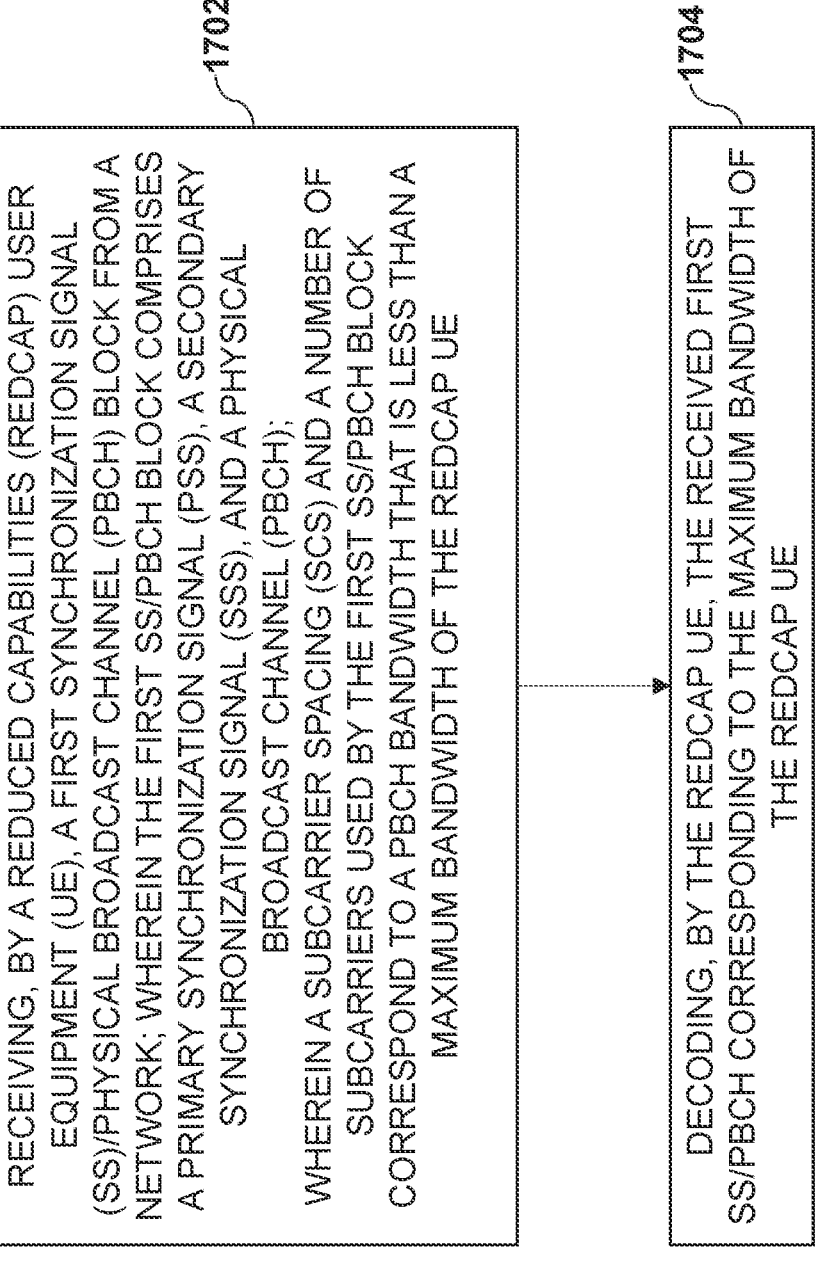

1702

RECEIVING, BY A REDUCED CAPABILITIES (REDCAP) USER EQUIPMENT (UE), A FIRST SYNCHRONIZATION SIGNAL (SS)/PHYSICAL BROADCAST CHANNEL (PBCH) BLOCK FROM A NETWORK; WHEREIN THE FIRST SS/PBCH BLOCK COMPRISES A PRIMARY SYNCHRONIZATION SIGNAL (PSS), A SECONDARY SYNCHRONIZATION SIGNAL (SSS), AND A PHYSICAL BROADCAST CHANNEL (PBCH);

WHEREIN A SUBCARRIER SPACING (SCS) AND A NUMBER OF SUBCARRIERS USED BY THE FIRST SS/PBCH BLOCK CORRESPOND TO A PBCH BANDWIDTH THAT IS LESS THAN A MAXIMUM BANDWIDTH OF THE REDCAP UE

1704

DECODING, BY THE REDCAP UE, THE RECEIVED FIRST SS/PBCH CORRESPONDING TO THE MAXIMUM BANDWIDTH OF THE REDCAP UE

FIG. 17

INITIAL ACCESS AND INITIAL BANDWIDTH PART CONFIGURATION FOR REDUCED CAPABILITY USER EQUIPMENTS

CROSS-REFERENCE TO RELATED APPLICATION(S)

This application claims the priority benefit under 35 U.S.C. § 119(e) of U.S. Provisional Application No. 63/314,366, filed on Feb. 25, 2022, the disclosure of which is incorporated by reference in its entirety as if fully set forth herein.

TECHNICAL FIELD

The disclosure generally relates to initial access and initial bandwidth part configuration. More particularly, the subject matter disclosed herein relates to improvements to initial access and initial bandwidth part configuration for reduced capability user equipments (UEs).

SUMMARY

Release 17 (Rel-17) of the 3rd Generation Partnership Project (3GPP) standardized Reduced Capability (RedCap) User Equipments (UEs) which reduces the capabilities of UE to operating in a limited bandwidth, for example, to 20 MHz in the Frequency Range 1 (FR1).

Release 18 (Rel-18) will likely further improve upon the standardization for RedCap UEs to a smaller bandwidth, which may be referred to as Narrow Band (NB) RedCap with a bandwidth of 5 MHz. With such a bandwidth reduction, there may be significant changes that are involved in the system. For instance, it may not always be possible to have a synchronization signal block (SSB) contained within 5 MHz of the maximum UE bandwidth. With the introduction of RedCap UEs, there may be specification impact on the UE initial access procedure (or "initial access process"), since RedCap UEs, which have lower bandwidth capability than legacy bandwidth requirements on UEs, may not be able to perform a legacy initial access procedure.

Thus, techniques for supporting a 5 MHz NB-RedCap UE, as well as how such techniques can coexist with the 20 MHz RedCap UEs and Non-RedCap UEs are desired.

According to some embodiments of the present disclosure, a method is disclosed. The method may include receiving, by a reduced capabilities (RedCap) user equipment (UE), a first synchronization signal (SS)/physical broadcast channel (PBCH) block from a network, wherein the first SS/PBCH block includes a primary synchronization signal (PSS), a secondary synchronization signal (SSS), and a physical broadcast channel (PBCH), wherein a subcarrier spacing (SCS) and a number of subcarriers used by the first SS/PBCH block corresponds to a PBCH bandwidth that is less than a maximum bandwidth of the RedCap UE, and decoding, by the RedCap UE, the received first SS/PBCH corresponding to the maximum bandwidth of the RedCap UE.

The method may further include receiving, by the RedCap UE, a second SS/PBCH block different from the first SS/PBCH block, the maximum bandwidth of the second SS/PBCH block being greater than the maximum bandwidth of the first SS/PBCH block.

The first SS/PBCH block may be received at a first frequency location and the second SS/PBCH block is received at a second frequency location different from the first frequency location.

The first SS/PBCH block may be configured to operate over four symbols, and the PSS occupies a first symbol of the four symbols, the SSS occupies the third symbol of the four symbols, and the PBCH occupies the second and fourth symbols of the four symbols.

The first SS/PBCH block may occupy less than 5 MHz of bandwidth.

According to other embodiments of the present disclosure, a method may include receiving, by a reduced capabilities (RedCap) user equipment (UE), a synchronization signal (SS)/physical broadcast channel (PBCH) block from a network, wherein the SS/PBCH block includes a primary synchronization signal (PSS), a secondary synchronization signal (SSS), a first set of physical broadcast channels (PBCH), a second set of PBCH, and a third set of PBCH, wherein the third set of PBCH is a duplicate of the second set of PBCH, and decoding, by the RedCap UE, the PSS, the SSS, the first set of PBCH, and the third set of PBCH.

The SS/PBCH block may be configured to operate over six symbols, wherein the PSS occupies a first symbol of the six symbols, the SSS occupies the third symbol of the six symbols, and the first and second sets of PBCH occupies the second, third, and fourth symbols of the six symbols, and the third set of PBCH occupies the fifth and sixth symbols of the six symbols.

At least a portion of the SS/PBCH block may include the PSS, the SSS, and the first and second sets of PBCH supports a legacy UE, and at least a portion of the SS/PBCH block including the PSS, the SSS, and the first and third sets of PBCH supports the RedCap UE.

The method may further include receiving, by the RedCap UE, a legacy control resource set (CORESET #0) and a legacy system information block (SIB1) multiplexed with a narrowband CORESET #0 and a narrowband SIB1, and decoding, by the RedCap UE, the narrowband CORESET #0 and the narrowband SIB1.

The method may further include receiving, by the RedCap UE, a plurality of bandwidth parts (BWPs), selecting, by the RedCap UE, one BWP of the plurality of BWPs based on a criteria defined in the SIB1, and sending, by the RedCap UE, a first message during a random access procedure, to the network.

The criteria may be based on evenly balancing traffic load across the plurality of BWPs.

A maximum bandwidth of the RedCap UE may be 5 MHz, at least a portion of the received SS/PBCH corresponding to the maximum bandwidth of the RedCap UE.

The method may further include rearranging bits for the third set of PBCH to an order corresponding to bits for the second set of PBCH, and decoding the bits for the first and third sets of PBCH, wherein the SS/PBCH block may be received in a synchronization signal burst set during an initial access, and the RedCap UE receives the PSS, the SSS, and bits for the first and third sets of PBCH.

According to some other embodiments of the present disclosure, a system may include a reduced capability (RedCap) user equipment (UE) including: a memory; and a processor configured to execute instructions stored in the memory to perform operations including: receiving, by the RedCap UE, a synchronization signal (SS)/physical broadcast channel (PBCH) block from a network; wherein the SS/PBCH block includes a primary synchronization signal (PSS), a secondary synchronization signal (SSS), a first set of physical broadcast channels (PBCH), a second set of PBCH, and a third set of PBCH; wherein the third set of PBCH is a duplicate of the second set of PBCH; and decoding, by the RedCap UE, the PSS, the SSS, the first set of PBCH, and the third set of PBCH.

The SS/PBCH block may be configured to operate over six symbols, wherein the PSS occupies a first symbol of the six symbols, the SSS occupies the third symbol of the six symbols, and the first and second sets of PBCH occupies the second, third, and fourth symbols of the six symbols, and the third set of PBCH occupies the fifth and sixth symbols of the six symbols.

At least a portion of the SS/PBCH block including the PSS, the SSS, and the first and second sets of PBCH supports a legacy UE, and at least a portion of the SS/PBCH block including the PSS, the SSS, and the first and third sets of PBCH supports the RedCap UE.

The system may perform operations that further include receiving, by the RedCap UE, a legacy control resource set (CORESET #0) and a legacy system information block (SIB1) multiplexed with a narrowband CORESET #0 and a narrowband SIB1, and decoding, by the RedCap UE, the narrowband CORESET #0 and the narrowband SIB1.

The system may include operations that further include: receiving, by the RedCap UE, a plurality of bandwidth parts (BWPs); selecting, by the RedCap UE, one BWP of the plurality of BWPs based on a criteria defined in the SIB1; and sending, by the RedCap UE, a first message during a random access procedure, to the network.

The criteria may be based on evenly balancing traffic load across the plurality of BWPs.

A maximum bandwidth of the RedCap UE may be 5 MHz, and at least a portion of the received SS/PBCH may correspond to the maximum bandwidth of the RedCap UE The system may include operations that further include rearranging bits for the third set of PBCH to an order corresponding to bits for the second set of PBCH, and decoding the bits for the first and third sets of PBCH, wherein the SS/PBCH block is received in a synchronization signal burst set during an initial access, and the RedCap UE receives the PSS, the SSS, and bits for the first and third sets of PBCH.

BRIEF DESCRIPTION OF THE DRAWINGS

In the following section, the aspects of the subject matter disclosed herein will be described with reference to exemplary embodiments illustrated in the figures, in which:

FIG. 4 illustrates different types of BWPs that are available for a UE in different RRC states, according to various embodiments of the present disclosure.

FIG. 13 is a flow chart illustrating an overall process, according to various embodiments of the present disclosure.

FIGS. 14-16 illustrate various core resource set (CORESET) design options, according to various embodiments of the present disclosure.

FIG. 17 is a flow chart illustrating an initial access process in which a UE obtains and decodes the PBCH, according to various embodiments of the present disclosure.

DETAILED DESCRIPTION

Figure 1:
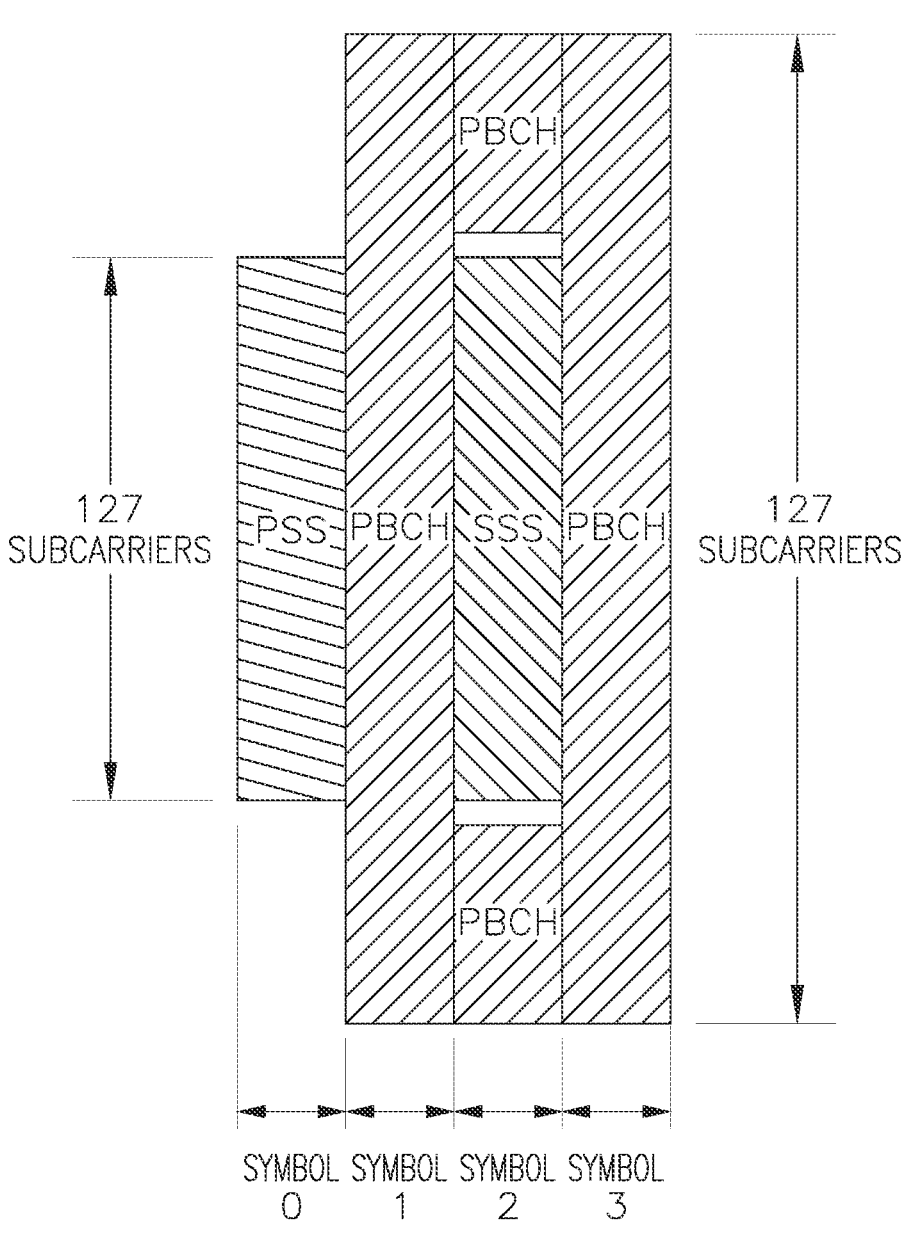
FIG. 1 illustrates and example structure of a synchronization signal block, according to various embodiments of the present disclosure.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.).

Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

Herein the present disclosure, the terms reduced capabilities (RedCap) is intended to refer to limited bandwidth capabilities of a UE that is not sufficient to meet legacy bandwidth requirements on UEs.

As used herein, "legacy" refers to a system lacking special provisions for accommodating bandwidth-limited RedCap UEs, or to an element of such a system (e.g., a legacy CORESET #0 or a legacy Physical Broadcast Channel (PBCH)). The terms synchronization signal block (SSB) may be used interchangeably with the terms synchronization signal/physical broadcast channel (SS/PBCH) block.

Capabilities of a RedCap device as provided in Rel-17 compared to the capabilities of Release 15 (Rel-15) New Radio (NR) devices include bandwidth reduction, reducing maximum number of MIMO layers, and relaxation of maximum downlink modulation order to reduce baseband complexity. Reducing the minimum number of required receive branches and allowing half-duplex (HD) operations in all bands help reduce the bill of material costs in terms of antennas and RF components. Each of the reduced capability features are described in more detail below.

Maximum device bandwidth: A baseline NR device supports 100 MHz in frequency range 1 (FR1), and 200 MHz in FR2, for transmission (Tx) and reception (Rx). For RedCap, these specifications are reduced to 20 MHz and 100 MHz, respectively. Such bandwidth reductions, however, may still allow all the physical channels and signals specified for initial acquisition to be readily reusable for RedCap devices, therefore minimizing an impact on network and device deployment when introducing RedCap to support the new use cases.

Minimum number of device receive branches: The number of receive branches is related to the number of receive antennas. Reducing the number of receive branches, therefore, results in a reduction in the number of receive antennas and cost savings. The requirements on the minimum number of receive branches depends on frequency bands. Some frequency bands (e.g., most FR1 frequency-division duplex (FDD) bands, some FR1 time-division duplex (TDD) bands, and all FR2 bands) involve a baseline NR device to be equipped with two receive branches, whereas some other frequency bands, e.g., in the FR1 TDD bands, involve the device to be equipped with four receive branches.

Maximum number of downlink MIMO layers: The maximum number of downlink MIMO layers for a RedCap device is the same as the number of receive branches it supports. This is a reduction compared to the specifications for a baseline device.

Maximum downlink modulation order: A baseline NR device supports 256 QAM in the downlink in FR1. For a RedCap device, the support of downlink 256 QAM is optional. For FR1 uplink and FR2 downlink and uplink, a RedCap device supports 64 QAM, the same as the specification for a baseline device.

Duplex operation: Relaxation of duplex operations may be achieved for operations in FDD bands. A baseline NR device supports a full duplex (FD) operation in an FDD band, i.e., transmitting and receiving on different frequencies at the same time. Some full-duplex devices incorporate duplex filter to isolate interference between the transmit and receive paths of a device. In practice, the same device may support multiple FDD bands. Therefore, multiple duplex filters may be involved to support the FD FDD operation. For a RedCap device, the support of FD FDD is optional, i.e., it is not a requirement to receive in the downlink frequency while transmitting in the uplink frequency, and vice versa. Such a duplex operation is referred to as half duplex FDD (HD FDD). HD FDD obviates a need for duplex filters. Instead, a switch may be used to select the transmitter or receive to connect to the antenna. As a switch is less expensive than multiple duplexers, cost savings may be achieved.

As provided in Rel-15, synchronization/initial access of a UE is based on a definition of a synchronization signal block (SSB). The SSB is a self-contained block that enables the UE to acquire a synchronization and an initial information from the network such as gNB. A structure of an example SSB block is depicted in FIG. 1.

An SSB includes a Primary Synchronization Signal (PSS), a Secondary Synchronization Signal (SSS), and a Physical Broadcast Channel (PBCH). The PSS is used to coarsely synchronize in frequency and time, the SSS is to finely synchronize and acquire time, and the PBCH contains the minimum information necessary to access the system.

Figure 2:
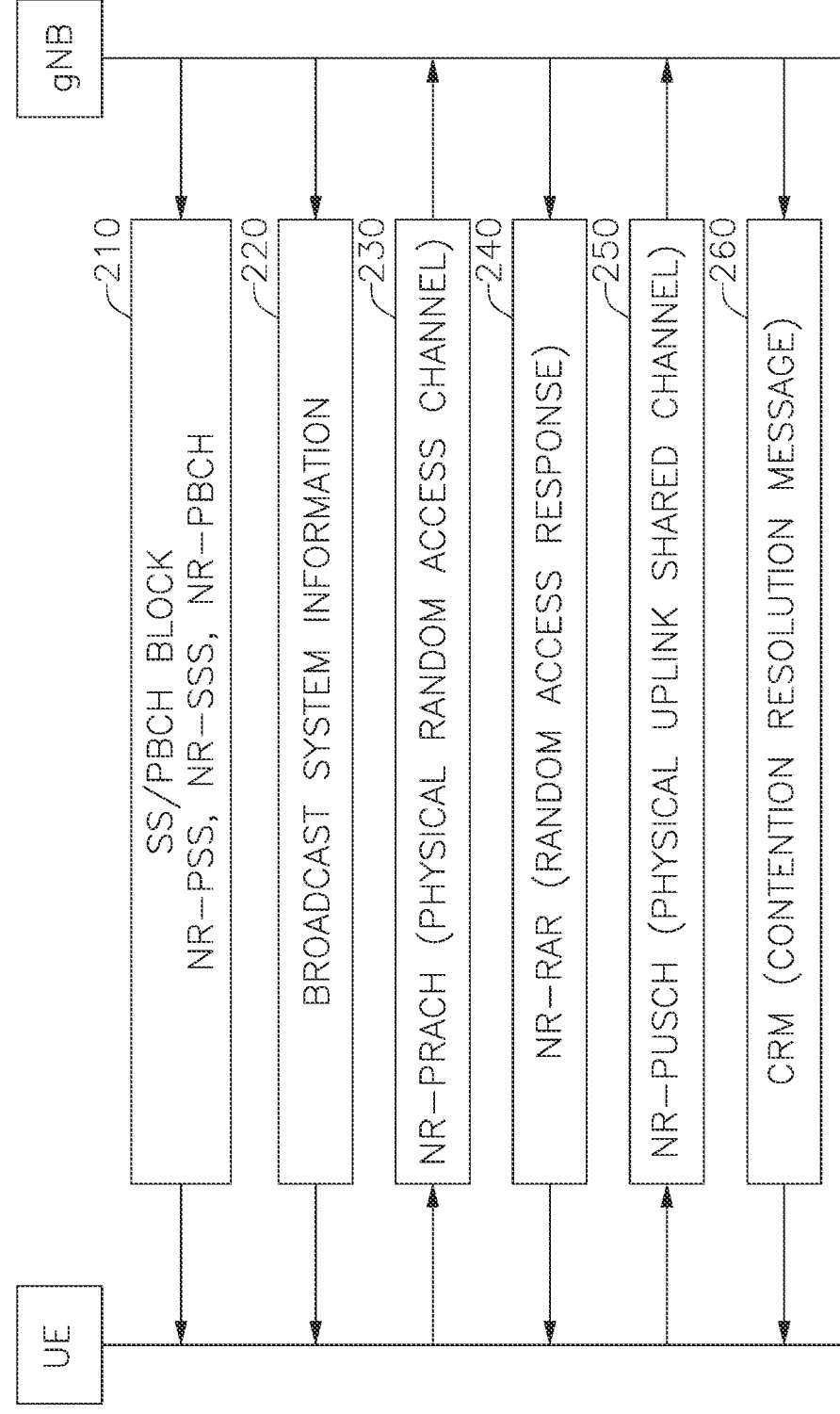
FIG. 2 illustrates an initial access procedure in NR, according to various embodiments of the present disclosure.

FIG. 2 depicts an initial access procedure in NR. As shown in FIG. 2, it may include (e.g., consist of) the following steps: at 210, the network base station (gNB) periodically transmits Synchronization Signal (SS) blocks (SSBs) carrying synchronization signals (including primary synchronization signals PSSs, and secondary synchronization signals (SSSs)) and Physical Broadcast Channels (PBCHs) using beam sweeping. One SS block contains one PSS symbol, one SSS symbol, and two PBCH symbols. A Synchronization Signal burst may carry one or multiple SS blocks. The combination of PSS and SSS may help to identify about 1008 physical cell identities. Each UE performs beam measurements and determines the best beam during synchronization.

Subsequently, at 220, the gNB transmits, and the UE receives and decodes, 5G New Radio (NR) system information viz. a Master Information Block (MIB) and a System Information Block (SIB) on that beam. Minimum SI (System Information) is carried on the Physical Broadcast Channel. The rest of the Remaining Minimum System Information (RMSI) and the SIB1 is carried on the Physical Downlink Shared Channel (PDSCH). The numerology used for the RMSI is indicated in the PBCH payload. CORESET #0 is dedicated for RMSI scheduling. CORESET #0 is not confined within PBCH Bandwidth. There is an RMSI Physical Downlink Control Channel (PDCCH) monitoring window associated with the SS/PBCH block, which recurs periodically. Other System Information (OSI) contains on-demand system information delivery. OSI is carried on the PDSCH using the same numerology as is used for the RMSI. At 230, the UE uses the same beam and attempts random access by transmitting a Random Access Channel (RACH) preamble (i.e., message 1, or "Message #1") on the configured RACH resource. The gNB responds, at 240 with a Random Access Response RAR ("RA Response") message, which is message 2, or "Message #2". The UE then transmits, at 250, message 3, or "Message #3" (i.e., a Radio Resource Control (RRC) Connection Request) in the Physical Uplink Shared Channel (PUSCH) (e.g., NR-PUSCH) channel. The gNB then responds, at 260, with message 4, or "Message #4" (i.e., RRC Connection Setup) which is the contention resolution message and which completes the initial access process.

Figure 3:
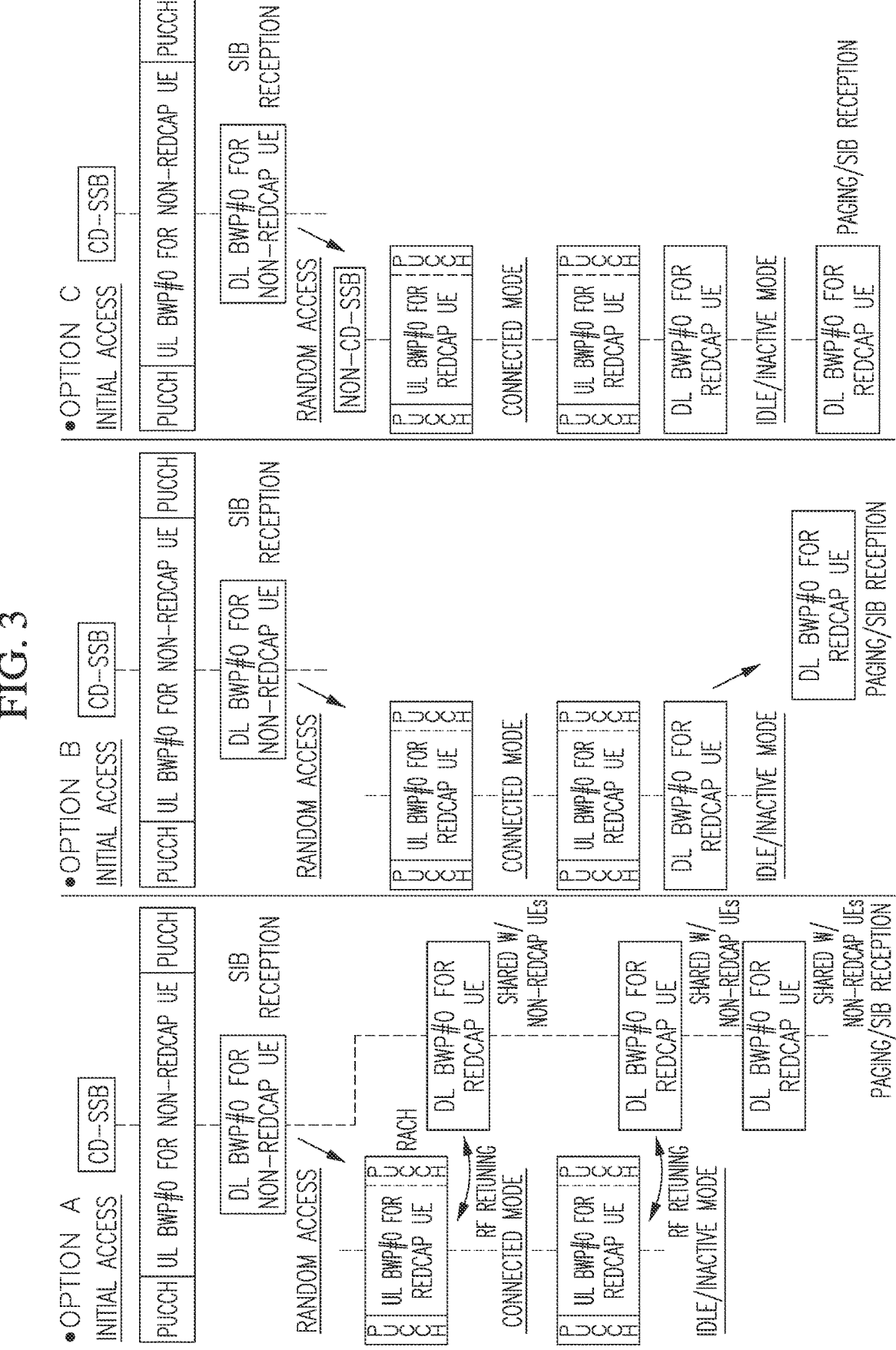
FIG. 3 illustrates a RedCap initial access and three options for Bandwidth Part (BWP) configurations for a RedCap UE in Radio Resource Control (RRC) idle/inactive state and connected state, according to various embodiments of the present disclosure.

FIG. 3 depicts a RedCap initial access and three options for Bandwidth Part (BWP) configurations for a RedCap UE in Radio Resource Control (RRC) idle/inactive state and connected state as discussed in Rel-17. While three options are described, Option B was agreed to in Rel-17, although options A and C are plausible in other releases.

Option A: Initial Downlink (DL) BWP may be shared by non-RedCap UEs and RedCap UEs using existing MIB/SIB configuration for idle/inactive/connected mode, i.e., the shared initial downlink (DL) BWP may be configured for random access and paging, and contains Cell-Defining CD-SSB, MIB-configured CORESET #0, and SIB1. Initial uplink (UL) BWP for RedCap UEs may be separately configured from that for non-RedCap UEs for idle/inactive/connected mode. Shared initial DL BWP and separate initial UL BWP have different center frequencies. The pros of option A is that no NCD-SSB is involved, no additional overhead of Paging/SIB. The cons of option A is that RF retuning is involved between DL reception and Uplink (UL) transmission.

Option B: Initial DL BWP for RedCap UEs may be separately configured from that for non-RedCap UEs for idle/inactive/connected mode, i.e., the separate initial DL BWP; may be configured for random access; and does not contain CD-SSB, MIB-configured CORESET #0, or SIB1. Initial DL BWP is shared by non-RedCap UEs and RedCap UEs using existing MIB/SIB configuration for idle/inactive mode, i.e., the shared initial DL BWP may be configured for paging, contains CD-SSB, MIB-configured CORESET #0, and SIB1. Initial UL BWP for RedCap UEs may be separately configured from that for non-RedCap UEs. Separate initial DL BWP and separate initial UL BWP may have the same center frequency. The pros of option B is that no NCD-SSB is involved, no additional overhead of Paging/SIB in idle/inactive mode. The cons of option B is that RF retuning is involved for CD-SSB reception, i.e., support FG6-1a as mandatory.

Option C: Initial DL BWP for RedCap UEs may be separately configured from that for non-RedCap UEs for idle/inactive/connected mode, i.e., the separate initial DL BWP may be configured for random access and paging, contains non-CD-SSB, and does not contain MIB-configured CORESET #0 or SIB1. Initial UL BWP for RedCap UEs may be separately configured from that for non-RedCap UEs. Separate initial DL BWP and separate initial UL BWP may have the same center frequency. The pros of option C is that RF retuning is not involved, and the con is that NCD-SSB is involved, additional overhead of Paging/SIB.

In 3GPP RAN1 107e, the following RedCap initial access and BWP configuration are agreed on, and up to one separate initial UL BWP for RedCap may be configured. For both FR1 and FR2, for a cell that allows a RedCap UE to access, the network may configure a separate initial DL BWP for RedCap UEs in SIB. At least the case in which the separate initial DL BWP includes CD-SSB and the entire CORESET #0 is supported, it can be used in idle/inactive mode (including paging) and during and after initial access, when applicable; it is no wider than the maximum RedCap UE bandwidth; and this applies to both TDD and FDD (including FD FDD and HD FDD) cases.

For FR1, for a separate initial DL BWP (if it does not include CD-SSB and the entire CORESET #0) from RAN1 perspective, if it is configured for random access while not for paging in idle/inactive mode, RedCap UE does NOT expect it to contain SSB/CORESET #0/SIB. Note: RAN1 assumes REDCAP UE performing Random access in the separate DL BWP does not need to monitor paging in a BWP containing CORESET #0. Working assumption: If it is configured for paging, RedCap UE expects it to contain NCD-SSB for serving cell but not CORESET #0/SIB from RAN1 perspective. For an RRC-configured active DL BWP in connected mode (if it does not include CD-SSB) from RAN1 perspective: A RedCap UE supporting mandatory FG 6-1 (but not optional FG 6-1a) expects it to contain NCD-SSB for serving cell but not CORESET #0/SIB; a RedCap UE can indicate the following as optional capability: Not need NCD-SSB: A RedCap UE can in addition optionally support relevant operation based on CSI-RS (working assumption) and/or FG 6-1a by reporting optional capabilities. Note: If a separate initial/RRC configured DL BWP is configured to contain the entire CORESET #0, CD-SSB is expected by RedCap UE. Note: The network may choose to configure SSB or MIB-configured CORESET #0 or SIB1 to be within the respective DL BWP. Note: If a separate SIB-configured initial DL BWP for RedCap UEs contains the entire CORESET #0, the RedCap UE shall use the bandwidth and location of the CORESET #0 in DL during initial access. Note: NCD-SSB periodicity is not required to be configured the same as that of CD-SSB. Note: Periodicity of NCD-SSB shall be not less than periodicity of CD-SSB For FR2, for a separate initial DL BWP (if it does not include CD-SSB) from RAN1 perspective, if it is configured for random access while not for paging in idle/inactive mode, RedCap UE does NOT expect it to contain SSB/ CORESET #0/SIB. Note: RAN1 assumes REDCAP UE performing Random access in the separate DL BWP does not need to monitor paging in a BWP containing CORESET #0. Working assumption: If it is configured for paging, RedCap UE expects it to contain NCD-SSB for serving cell but not CORESET #0/SIB from RAN1 perspective. For an RRC-configured active DL BWP in connected mode (if it does not include CD-SSB) from RAN1 perspective, a RedCap UE supporting mandatory FG 6-1 (but not optional FG 6-1a) expects it to contain NCD-SSB for serving cell but not CORESET #0/SIB. A RedCap UE can indicate the following as optional capability: Not need NCD-SSB: A RedCap UE can in addition optionally support relevant operation based on CSI-RS (working assumption) and/or FG 6-1a by reporting optional capabilities. Note: For SSB and CORESET #0 multiplexing pattern 1, if a separate initial/RRC configured DL BWP is configured to contain the entire CORESET #0, CD-SSB is expected by RedCap UE. Note: The network may choose to configure SSB or MIB-configured CORESET #0 or SIB1 to be within the respective DL BWP. Note: If a separate SIB-configured initial DL BWP for RedCap UEs contains the entire CORESET #0, the RedCap UE shall use the bandwidth and location of the CORESET #0 in DL during initial access. Note: NCD-SSB periodicity is not required to be configured the same as that of CD-SSB. Note: Periodicity of NCD-SSB shall be not less than periodicity of CD-SSB.

Rel-15 NR BWP Configuration

Figure 4:
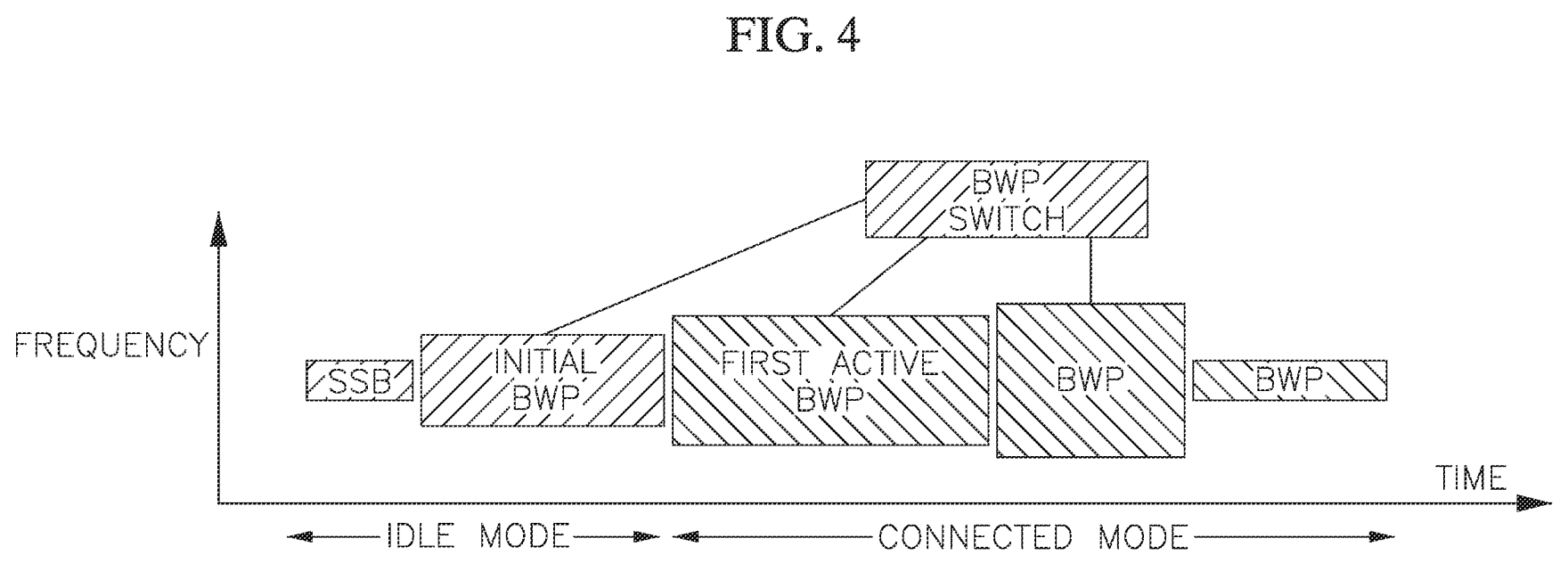

FIG. 4 depicts different types of BWPs that are available for a UE in different RRC states. Three types of BWP are defined: a) Initial BWP (common for all UEs); b) Active BWP (UE Specific); and c) Default BWP (UE Specific). The initial BWP may be used to perform Initial Access procedure, and may include Parameters like RMSI (Requested Minimum System Information), CORESET #0, and RMSI Frequency location/bandwidth/SCS (Service Capability Server). The initial BWP may be 24-96 Physical Resource Blocks (PRBs) with different settings and relaxed to wider BWP after RMSI decoding. The active BWP may be defined as UE specific. It is the first BWP in which a UE starts data transfer after RRC configuration/reconfiguration. The very first Active BWP should be different from the default BWP.

Table 1 shows the BWP configurations at different stages of initial access process in which both UL and DL BWP are considered. The BWP configuration may be split into uplink and downlink parameters as well as into common and dedicated parameters. Common parameters (in BWP-UplinkCommon and BWP-DownlinkCommon) are "cell specific" and the network ensures the alignment with corresponding parameters of other UEs. The common parameters of the initial BWP of the PCell may also be provided via system information. For all other serving cells, the network provides the common parameters via dedicated signaling.

TABLE 1

| Step | Stage | DL BWP | UL BWP | Processing |
|---|---|---|---|---|
| 0 | PSS and SSS Decode | | | DL Synchronization |
| 1 | MIB decode | | | UE decode MIB and get CORESET #0 configuration |
| 2 | RMSI decode | CORESET #0 | | Get Initial DL-BWP and Initial UL-BWP setting for RMSI decoding |
| 3 | Msg-1-UE >– –> gNB | | Initial UL-BWP | Random Access Request to gNB |
| 4 | Msg-2-UE <– –< gNB | CORESET #0 | | Random Access Response (RAR) gNB |
| 5 | Msg-3-UE >– –> gNB | | Initial UL-BWP | RRC connection request |
| 6 | Msg-4-UE <– –< gNB | CORESET #0 | | RRC connection setup Configure UE specific BWP (default/ 1st active/other) BWP If not configured, still use initial BWP |
| 7 | Msg-5-UE >– –> gNB | 1st Active BWP | 1st Active BWP | RRC set-up completed Initial BWP is the 1st Active BWP if no additional configuration carried in Msg4 |

Msg1 for Random Access

In a scenario in which the initial BWPs of NB RedCap UE are overlapped with other UE types, early identification of NB RedCap UEs via message 1 transmissions involve a gNB to transmit a different Message 2 (Msg2) to different UE types, e.g., to avoid ambiguity of a Message 2 reception. Even without initial BWP overlapping, there may be some advantages in early identification of BR RedCap UEs because, for example, the RedCap UEs can have lower number of receive antennas and/or lower processing capabilities than existing units.

In one embodiment, a separate Random Access (RACH) Occasion (RO) pool may be configured for each narrowband initial UL BWP with a one-to-one correspondence between UL BWPs and RO pools. Thus, for msg1 transmission, a NB RedCap UE that selects a specific UL initial BWP uses a specific RO pool other than the RO pools of other NB RedCap UEs using other initial UL narrowband BWPs, other Rel-17 RedCap UEs and non-RedCap UEs. Because a NB RedCap UE transmits msg1 by selecting a preamble and RO in a different fully orthogonal RO pool than other NB RedCap UEs using other initial UL narrowband BWPs, other Rel 17 RedCap UEs and non-RedCap UEs, the gNB may differentiate it from other types of the UEs for preparing the msg2 RAR transmissions. By transmitting in a specific RO pool associated with the specific initial UL BWP, it is possible to early indicate NB RedCap UE from other Rel-17 RedCap UEs and non-RedCap UEs at the gNB. In another solution, a msg1 transmission may be designed with preamble repetitions in time domain for NB RedCap UE to compensate the coverage loss due to the narrow band UL transmissions. In particular, a NB RedCap UE may determine the number of preamble repetitions for msg1 transmissions based on the measured SSB RSRP values in the cell search SSB detection. If the measured RSRP value is larger than a certain pre-defined threshold, an NB RedCap UE may increase one level of the time-domain repetition of preamble transmissions.

In some embodiments, a msg1 transmission may be designed with preamble repetitions in time domain for NB RedCap UE to compensate the coverage loss due to the narrow band UL transmissions. In particular, a NB RedCap UE may determine the number of preamble repetitions for msg1 transmissions based on the measured SSB RSRP values in the cell search SSB detection. If the measured RSRP value is larger than a certain pre-defined threshold, the NB RedCap UE may increase one level of the time domain repetition of preamble transmissions.

In some embodiments, maximum bandwidth for NB RedCap UE may be further reduced from 20 MHz to 5 MHz in FR1. Due to such further reduction in the maximum NB RedCap UE BW, it may be desirable to enhance several aspects, including BWP configuration and BWP switching mechanism. To do so, it may be desirable to resolve some concerns.

The SSB bandwidth includes 240 subcarriers. Thus, for a 15 kHz SCS, this corresponds to 3.6 MHz, and therefore a 5 MHz NB RedCap UE may be able to receive it. However, for a 30 kHz SCS, the bandwidth is 7.2 MHz, and therefore a 5 MHz NB RedCap UE may not be able to fully receive the entire SSB. Therefore, there may be a need for a new structure for the SSB for NB RedCap UEs operating at or greater than about 30 kHz SCS.

With a 5 MHz bandwidth, resources for performing random access may be scarcer than with a 20 MHz bandwidth. Yet, a relatively large number of 5 MHz NB RedCap UEs (e.g., sensors) may be anticipated in a system because RedCap UEs are less expensive. This might create congestion on the RACH, thereby possibly making it more difficult for not only the NB RedCap UEs, but also the legacy non-RedCap UEs to access the system that shares the same physical resources. Therefore, congestion-relieving techniques for the NB RedCap UEs are desired.

In some instances, due to the limited maximum UE bandwidth, both DL and UL performance may degrade. For DL, the coverage of Physical Downlink Shared Channel (PDSCH) and Physical Downlink Control Channel (PDCCH) may be degraded due to a loss in frequency selective scheduling gain and frequency diversity. For UL, the coverage of Physical Uplink Control Channel (PUCCH) and Physical Uplink Shared Channel (PUSCH) may be affected due to a loss in frequency diversity, hopping gain, and selective scheduling gain.

Figure 5:
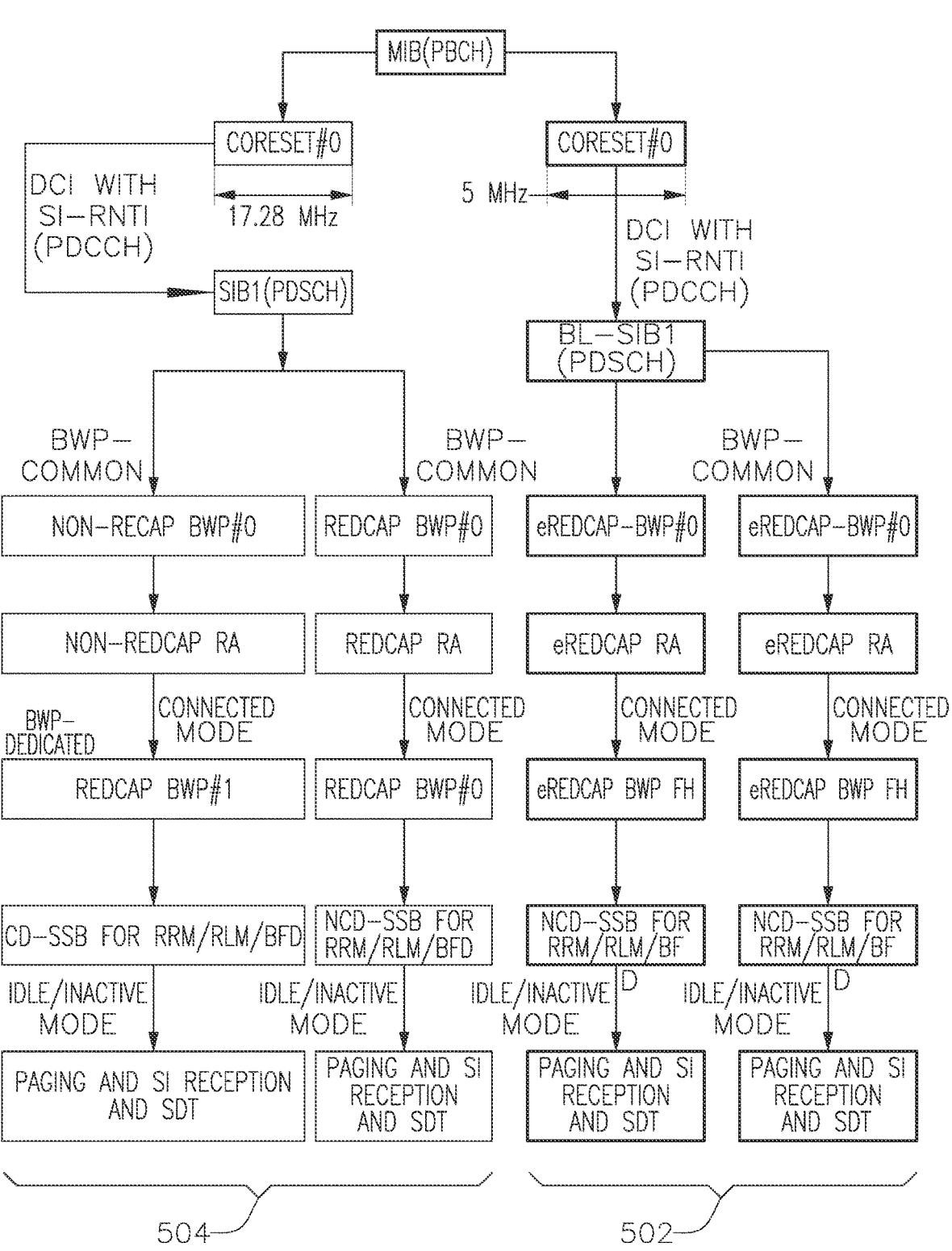
FIG. 5 illustrates a high-level overview of the initial access and initial bandwidth part configuration, according to various embodiments of the present disclosure.

FIG. 5 illustrates a high-level overview of the initial access and initial bandwidth part configuration, according to the embodiments of the present disclosure. It is disclosed herein to handle the coexistence of Rel-18 NB RedCap, Rel-17 RedCap, and Non-RedCap UEs. The processes described in boxes 502 may be followed for the NB RedCap UEs, and the processes described in boxes 504 may be followed for the Rel-17 RedCap UEs as well as the non-RedCap UEs.

As shown in FIG. 5, because the maximum supported UE BW may be less than legacy Physical Broadcast Channel (PBCH) bandwidth, the PBCH may be modified so that NB RedCap UEs may be able to decode the PBCH. After obtaining the PBCH, NB RedCap UEs may obtain system information block 1 (SIB1) on a set of dedicated CORESET #0 configurations. These configurations, named BL-CORESET #0, may be indicated in several ways, for example, such that the PBCH content may remain unchanged, and both the NB-RedCap UEs and other UEs obtain the CORESET #0 index in the MIB but interpret it differently. In some embodiments, a new table giving the set of PRBs occupied by CORESET #0 may be introduced, and depending on the UE bandwidth (e.g., NB RedCap or others), a UE may use either the legacy table or the new table, to obtain its CORESET #0. Other solutions may be contemplated (e.g., various ways of indicating BL-CORESET #0) but the techniques described according to the embodiments of the present disclosure involves only few changes to existing standards specifications. After monitoring the BL-CORESET #0, a NB RedCap UE may also decode a dedicated new BL-SIB1 in the PDSCH.

Accordingly, the embodiments of the present disclosure provides techniques to: support SCS of 30 kHz with SSB transmissions with NB RedCap max BW of 5 MHz; design a initial access procedures and initial BWP for NB RedCap UEs to cope with the high density UEs and congestions in the random access; and design a narrow band PDCCH to compensate the coverage loss for NB RedCap UEs.

New PBCH Structure for NB RedCap UEs

In some embodiments, PBCH may be modified to ensure that a 5 MHz NB RedCap UEs may be able to decode the PBCH. The PBCH occupies 240 subcarriers. The bandwidth of the synchronization signals/PBCH are shown in Table 2.

TABLE 2

|  | 15 kHz SCS | 30 KHz SCS | 60 KHz SCS |
|---|---|---|---|
| PSS | 1.9 MHz | 3.8 MHz | 7.6 MHz |
| SSS | 1.9 MHz | 3.8 MHz | 7.6 MHz |
| PBCH | 3.6 MHz | 7.2 MHz | 10.8 MHz |

As shown in Table 2, for the 15 kHz SCS, the NB RedCap UE may receive all the synchronization signals and the PBCH because the PSS, SSS, and PBCH are all less than 5 MHz. Thus, a NB RedCap UE may receive the SSB without any changes. However, for the 30 kHz SCS, the NB RedCap UE may receive the synchronization signals (PSS and SSS), but cannot receive the PBCH because the PBCH is more than 5 MHz. Thus, the PBCH should be changed so that NB RedCap UE may be able to receive the PBCH. Similarly, for the 60 kHz SCS, the NB RedCap UE may receive neither the synchronization signals (PSS and SSS) nor the PBCH because they are all more than 5 MHz. To support 60 kHz SCS, the synchronization signals and the PBCH should be changed.

The embodiments of the present disclosure will describe techniques to support NB RedCap UE when operating with a 30 kHz SCS and 5 MHz bandwidth where the UE is able to receive the full PSS and SSS but not the receive the full PBCH, by way of example. It should be noted, however, that a person skill in the art would be able to apply the same or similar techniques to other SCS or maximum RedCap bandwidths.

In some embodiments, the PBCH resource elements (REs) that are beyond or outside of the 5 MHz bandwidth may be punctured. Accordingly, no changes need to be made to the standards but is achieved at a reduction in PBCH coverage for the 5 MHz NB RedCap UEs.

Figure 6:
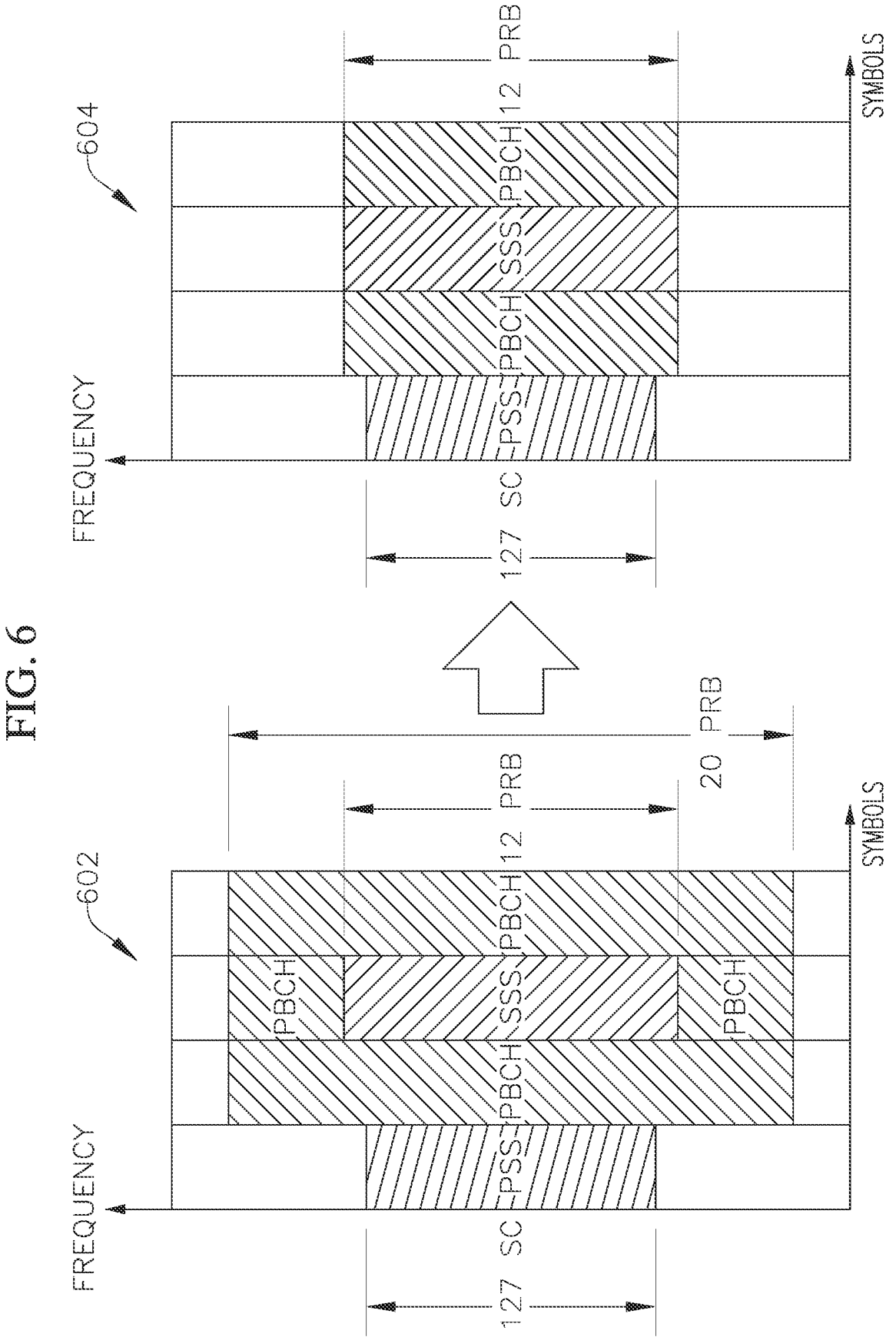
FIG. 6 illustrates an example eSSB in comparison with the legacy SSB that includes a new channel, ePBCH, according to various embodiments of the present disclosure.

In some embodiments, a new SSB may be designed, called eSSB, occupying 12 resource blocks (RBs). Accordingly, FIG. 6 illustrates an example eSSB 604 in comparison with the legacy SSB 602 that includes a new channel, ePBCH. In other words, the PBCH in the SSB 602 that occupies 20 PRBs is replaced with an ePBCH that occupies just 12 PRBs. Here, the ePBCH may occupy 4.3 MHz for a 30 kHz SCS, and therefore may be decoded by a NB RedCap UE that has a maximum bandwidth of 5 MHz. In some embodiments, bandwidths larger than 12 RBs may be used to get even closer to 5 MHz. Accordingly, this separate eSSB 604 may be transmitted for NB RedCap UEs in a different synchronization raster than the ones of a legacy SSB 602. In this case, the NB RedCap UEs may be assumed to have prior knowledge of the specific synchronization raster positions for receiving eSSB 604, whereas a legacy UE just performs the legacy operation of receiving legacy SSB 602.

Figure 7:
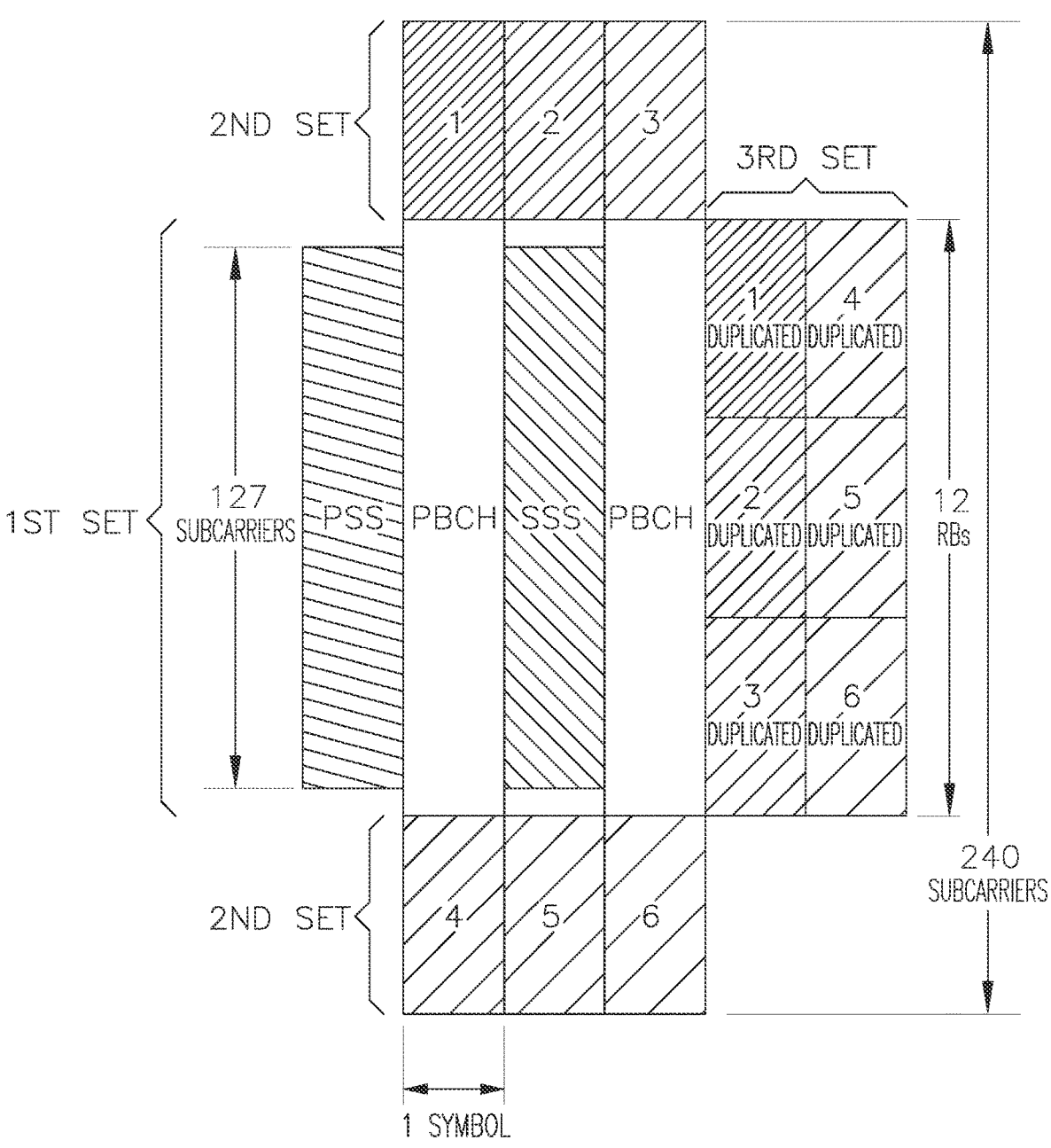
FIG. 7 illustrates an example SSB with two added PBCH symbol, according to various embodiments of the present disclosure.

In some embodiments, instead of creating a new SSB as described above, the current SSB may be kept for legacy UEs but certain portions of the PBCH that are outside of the 5 MHz bandwidth may be duplicated by adding two PBCH symbols to support the NB RedCap UEs that have a limited bandwidth of 5 MHz. Accordingly, FIG. 7 illustrates an example SSB with two added PBCH symbols. Thus, as shown in FIG. 7, the PSS and symbols 1-3 which include the SSS and the PBCH remain unchanged from the current SSB structure. However, the portions of PBCH that are beyond the 5 MHz bandwidth, which are indicated by reference numbers 1-6 in FIG. 7, are duplicated and added to the SSB as symbols 4 and 5. Accordingly, the duplicated portions of the PBCH now occupy just 12 RBs and are supported by the 5 MHz bandwidth of an NB RedCap UE. Furthermore, this embodiment is advantageous because the unchanged portion of the SSB is able to fully support legacy Rel-17 RedCap and non-RedCap UEs, while the SSB including the duplicated PBCH portion is able to fully support the NB RedCap UEs with the limited bandwidth, thus maintaining backwards compatibility while keeping the same coding rate for the PBCH for both NB RedCap UEs and legacy RedCap UEs. It should be noted that similar techniques may be applied to support, for example, yet an even more reduced bandwidths by modifying the PBCH and/or SSB structure as described according to the embodiments of the present disclosure. It is also noted that the symbols are labeled starting with symbol 0, 1, 2, 3, 4, 5, 6, 7, etc. However, herein the present disclosure, symbol 0 may be referred to as the first symbol because it is the first symbol that is illustrated in the drawings, symbol 1 may be referred to as the second symbol, and so on.

In some embodiments, the eSSB as described with reference to FIG. 6 and the modified SSB including the duplicated PBCH as described with reference to FIG. 7 occupies two additional symbols that were not occupied in legacy SSB and CORESET #0. Thus, to ensure compatibility of their coexistence with the legacy system design, techniques to multiplex the eSSB and BL-CORESET #0 for backward compatibility is desired.

Figure 8:
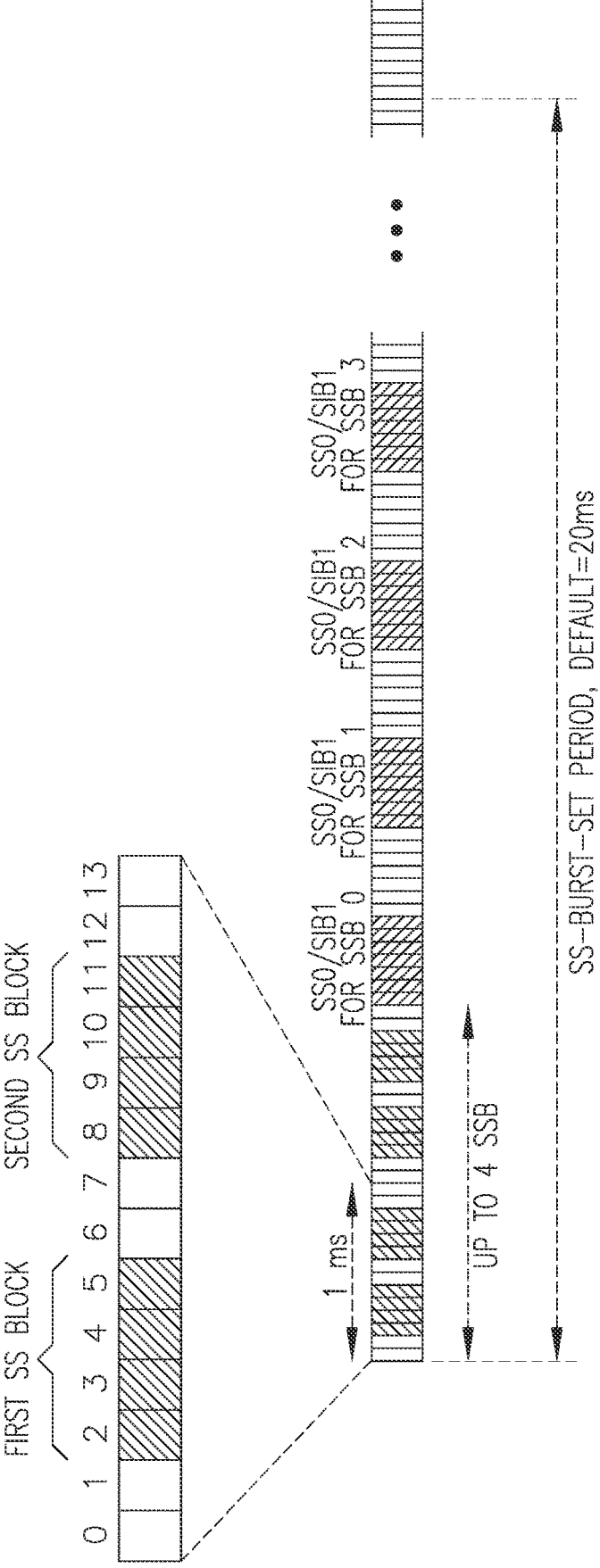
FIG. 8 illustrates an example legacy SS/PBCH block showing which symbols the SSB occupies, according to various embodiments of the present disclosure.

FIG. 8 illustrates an example legacy SS/PBCH block showing which symbols the SSB occupies. Here, legacy SS/PBCH blocks start during symbols 2, 8, 16, 22, search space set offset=2, 1 Search Space Set per Slot (M=1), CORESET duration=2 symbols. For example, the first SSB occupies symbols 2-5 and the second SSB occupies symbols 8-11, and so on. Thus, as can be seen, there is a space between the first SSB and the second SSB at symbols 6 and 7, and between the second SSB and the third SSB at symbols 12 and 13.

According to some embodiments, the eSSB and BL-CORESET #0 may be configured in the empty symbols (e.g., symbols 6 and 7 in FIG. 8) that are not occupied by the legacy SSB and CORESET #0 configurations of FR1 and multiplexing pattern 1 in 3GPP TS 38.213. In this case, all of the legacy CORESET #0 and CSS type #0 configurations of FR1 and multiplex pattern 1 may be kept. In other words, the eSSB which occupies four symbols may be split up into two groups of two symbols so that two out of the four symbols may occupy the first group of empty symbols (e.g., symbols 6 and 7 in FIG. 8) and the other two symbols out of the four symbols may occupy the second group of empty symbols (e.g., symbols 12 and 13 in FIG. 8). Accordingly, both the legacy SSB and eSSB may be multiplexed into one SS/PBCH block, thus providing backwards compatibility. For the legacy SSBs that occupy symbol (4, 8, 16, 20) in which there are not empty symbols in between some legacy SSB transmissions, another solution may be to have the eSSB transmitted on other symbols than symbol 4 and 5 subject to legacy SSB, or possibly even in a different slot.

Figure 9:
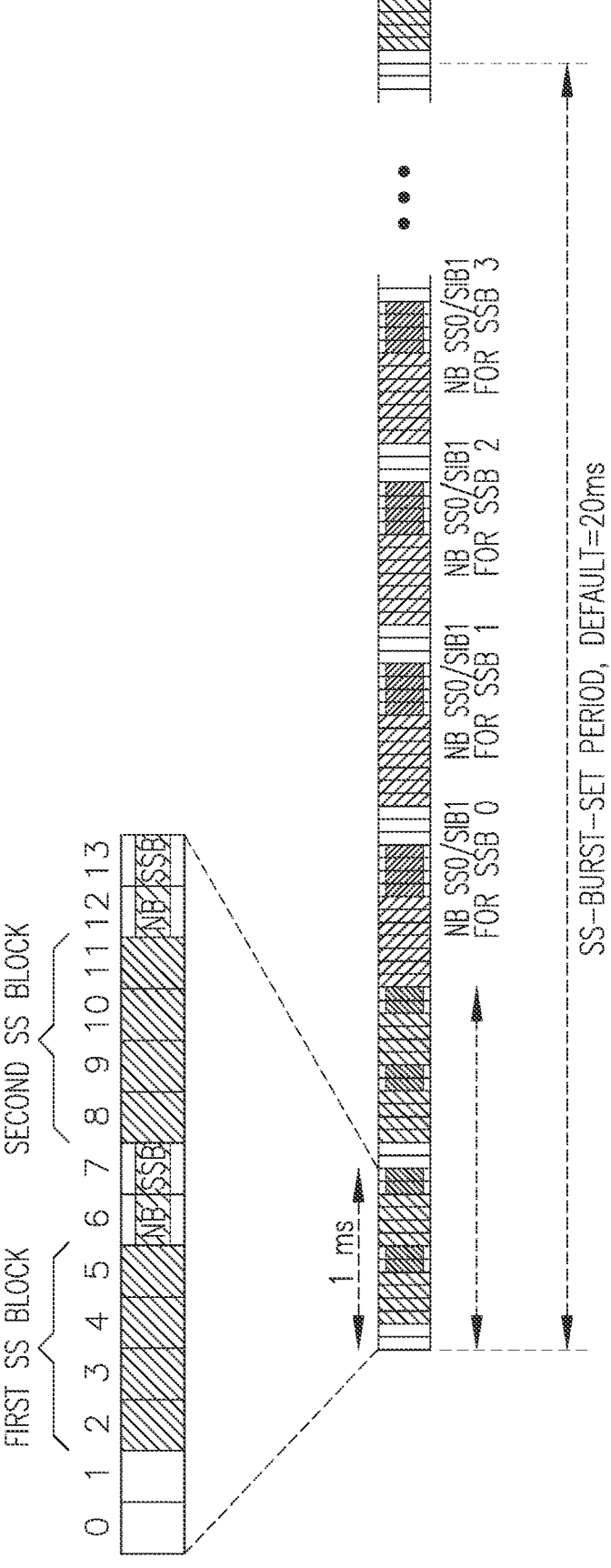
FIG. 9 illustrates an example embodiment where the legacy SSB and the new eSSB are multiplexed together, according to various embodiments of the present disclosure.

FIG. 9 illustrates an example embodiment where the legacy SSB and the new eSSB are multiplexed together. According to the example embodiment of the Enhanced SS/PBCH blocks starting during symbols 2, 8, 16, 22, search space set offset=2, 1 Search Space Set per Slot (M=1), CORESET duration=2 symbols. The NB SSB may occupy the symbol 4 and 5 in the slot that are not occupied by legacy SSB or CORESET #0. In the meantime, the BL-CORESET #0 and SIB1 for NB RedCap UE may be multiplexed in time on the symbols and slots that are not occupied by the legacy CORESET #0.

On symbols 1, 2, 3, the (legacy) PBCH occupies 20 PRBs, thus a total of 60 Resource Blocks (RBs) for the legacy PBCH. Over 5 symbols and 12 PRBs, there are a total of 60 RBs. Thus, by repeating the information on the PRBs outside of the central 12 PRBs of the PBCH of symbols 1-3 on the 12 central PRBs of NB PBCH, the number of bits may be kept the same (or not). Turning back to FIG. 7, the bits in block 1 may be repeated on symbols 4 and 5 of the new SSB, and likewise for blocks 2-6. The existing PBCH is present as is, so that legacy UEs may decode the PBCH. NR RedCap UEs only receive the PBCH on the 12 central RBs in symbols 1-3, and thus do not receive the initial transmission of blocks 1-6. To ensure that they receive the PBCH, blocks 1-6 may be transmitted on symbols 4-5 in the 12 central RBs. This way, the NB RedCap UEs may obtain all the PBCH coded bits, albeit in a different order than a legacy UE. It should be noted that the exact order and/or shape of blocks 1-6 are provided by way of example only and any other mapping may be used as well. Additionally, more redundancy bits could be transmitted for NB RedCap UEs (e.g., on RBs 13-14).

Figure 10:
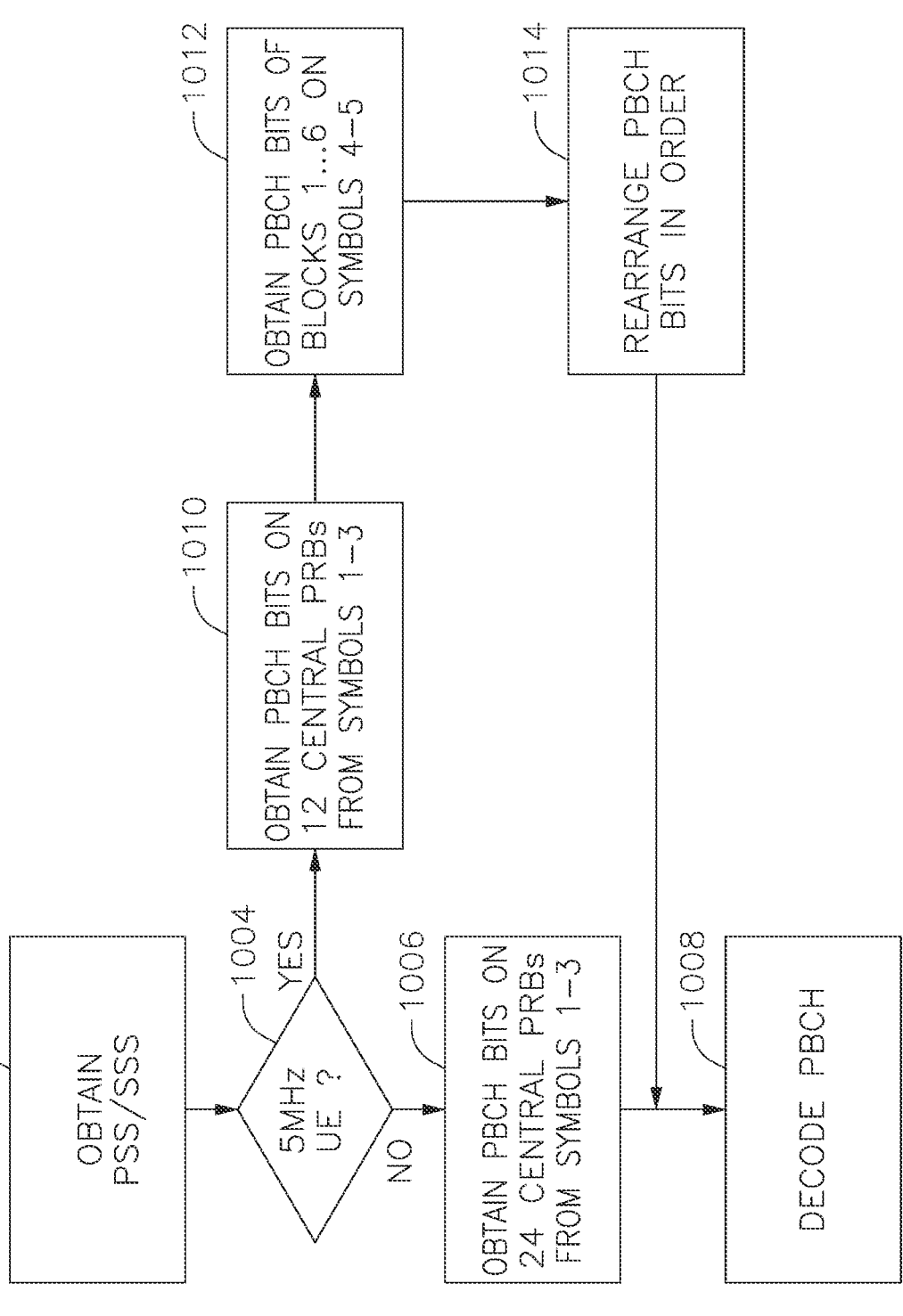
FIG. 10 is a flow chart illustrating an initial access process in which a UE obtains and decodes the PBCH, according to various embodiments of the present disclosure.

FIG. 10 is a flow chart illustrating an initial access process in which a UE obtains and decodes the PBCH. While shown with the same number of bits for legacy or NB mapping of the PBCH, may be possible to have the PBCH on symbols 4-5 (of FIG. 7) occupying more than 12 PRBs. In this way, coverage of for the NB RedCap UEs may be increased, if desired. In general, the reduced PBCH may be equal or less than 12 PRBs, such that the SSB with SCS of 30 kHz may be decoded by Rel-18 NB RedCap UEs. A coverage enhancement solution may be provided in case the PBCH BW is decreased. A time-domain extended resource of PBCH may be one solution but it may impact the legacy SSB pattern design, because there may be pre-defined empty symbols between each SSB indexes in a SSB burst. Alternatively, the MIB payload size may be reduced to maintain the coverage of PBCH reception.

Accordingly, an initial access process may be performed by the UE, where the primary synchronization signal (PSS) and secondary synchronization signal (SSS) are received by the UE (1002). If the UE is a RedCap UE (e.g., a UE that is bandwidth-limited to 5 MHz) (1004), then step 1010 will be processed, whereas if the UE is a legacy UE, then step 1006 will be process. Thus, if the UE is a legacy UE, then the legacy PBCH bits (e.g., as shown in FIG. 1 with 24 central PRBs from symbols 1-3 (i.e., second through fourth symbols)) are obtained from the broadcast signal (1006). If the UE is a RedCap UE, then fewer PBCH bits from the central portion of the PRBs (e.g., 12 central PRBs from symbols 1-3 as shown in FIG. 7) are obtained from the broadcast signal (1010). Next, the RedCap UE may obtain additional PBCH bits from symbols 4 and 5 (i.e., fifth and sixth symbols) (1012). As shown in FIG. 7, the PBCH bits obtained from symbols 4 and 5 correspond to the bits that were not obtained from symbols 1-3 that are outside of the bandwidth limits of the RedCap UE. That is, the upper and lower portions of the PBCH as illustrated in FIG. 7 with reference numbers 1-6, which are duplicated in symbols 4-5. Accordingly, by obtaining bits from symbols 0-5 of the RedCap SS/PBCH, the RedCap UE is able to obtain all the bits that a legacy UE would obtain from symbols 0-3 of the legacy SS/PBCH. Once the RedCap UE obtains all of the bits, then PBCH bits may be rearranged in the manner in which the PBCH bits are typically arranged in a legacy PBCH (1008). Finally, the RedCap UE may decode the PSS, SSS, and PBCH bits (1008).

In some embodiments, one approach may be to keep the legacy SSB BW of 4.32 MHz for 30 kHz SCS, but to allow NB RedCap UEs to acquire the SSB via $1^{st}$ decoding of $1^{st}$ part of SSB BW (e.g., on the lower section of the SSB bandwidth) and then perform frequency re-tuning to perform the $2^{nd}$ part decoding of SSB BW (e.g., on the upper section of the SSB bandwidth). In this case, a new UE behavior may be defined to allow the NB RedCap UEs to perform two SSB decoding and frequency retuning, as shown in FIG. 8. A NB RedCap UE first decodes part of a given SSB index in the one SSB occasion and then decodes the remaining part of the same SSB index in the next SSB occasion after performing frequency retuning. Thus, a NB RedCap UE involves twice the amount of the time to perform SSB detection as compared to a legacy SSB detection. Another potential issue may be that in-band interference from the one part of the SSB transmission when UE decoding another part of the SSB transmission. UE implementations to minimize such out-of-band interference may be desirable.

Figure 11:
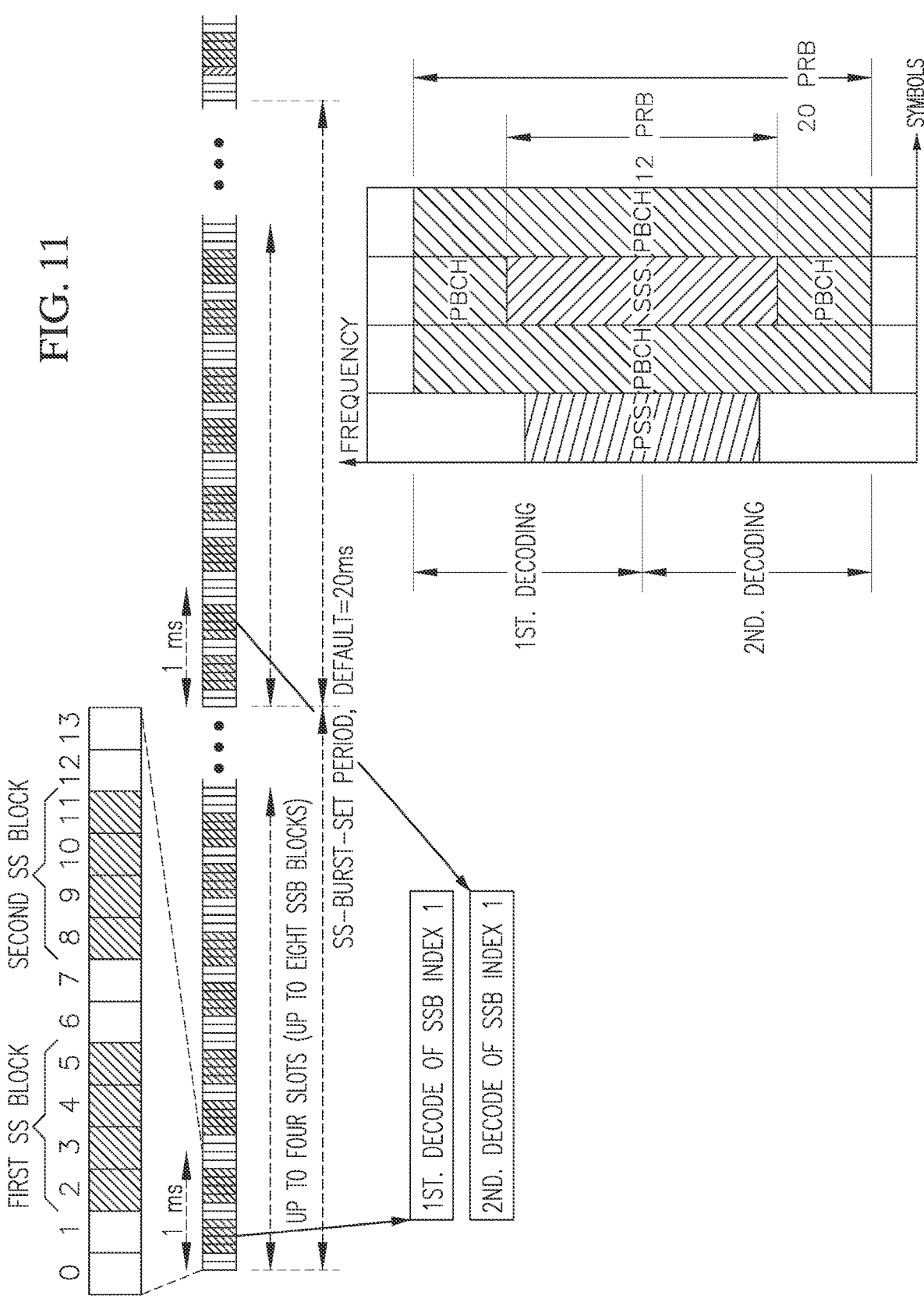
FIG. 11 illustrates a decoding process, according to various embodiments of the present disclosure.

As shown in FIG. 11, a NB RedCap UE first decodes part of the SSB index 1 in the $1^{st}$ SSB burst and then performs RF retuning to decode the other part of SSB index 1 in the next SSB burst.

BWP Selection for Random Access

Due to a potential large number of NB RedCap UEs performing random access procedures within a limited maximum UE BW or BWP, the network may configure multiple narrow band initial DL and UL BWPs (referred to as i DL BWP and i UL BWP) to alleviate congestion in a single initial DL and UL BWP. The set of multiple initial narrow DL and UL BWPs may be pre-configured in the (e)SIB1 as defined in the "Study on Support of Reduced Capability NR Devices," 3GPP TR 38.875, March 2021, and allow each NB RedCap UE to select an initial UL BWP for sending msg1 in the random access procedure. For example, there may be i UL BWP 1, i UL BWP 2, i UL BWP 3, i UL BWP 4 pre-configured by the network in eSIB1. In each of the i UL BWPs, there may be a dedicated RO pool that is mapped to the whole set of SSBs in which the RO pools may be fully orthogonal to each other in frequency and time domain physical resources.

Each NB RedCap UE may select one of the i UL BWPs and/or i DL BWPs in the following manner: 1) Randomly, with each probability, such that the traffic load may be balanced over different i UL BWPs and/or i DL BWPs. 2) Alternatively, the network may assign a probability to each of the i UL BWP and/or i DL BWP, such that the NB RedCap UE may select one of the i UL BWPs and i DL BWPs with a probability P which is assigned by the network. In this way, the network may assign the more NB RedCap UEs to the less congested initial BWPs, by pre-configuring such a probability value for a given initial BWPs. 3) The UL BWP/DL BWP may be selected by the UE e.g., based on a UE ID. This way, on average, each BWP may be equally loaded. 4) A UE may perform measurements to detect which BWP is the least loaded. 5) The UL BWP/DL BWP may be configured for a certain type of traffic, a given priority, etc.

Figure 12:
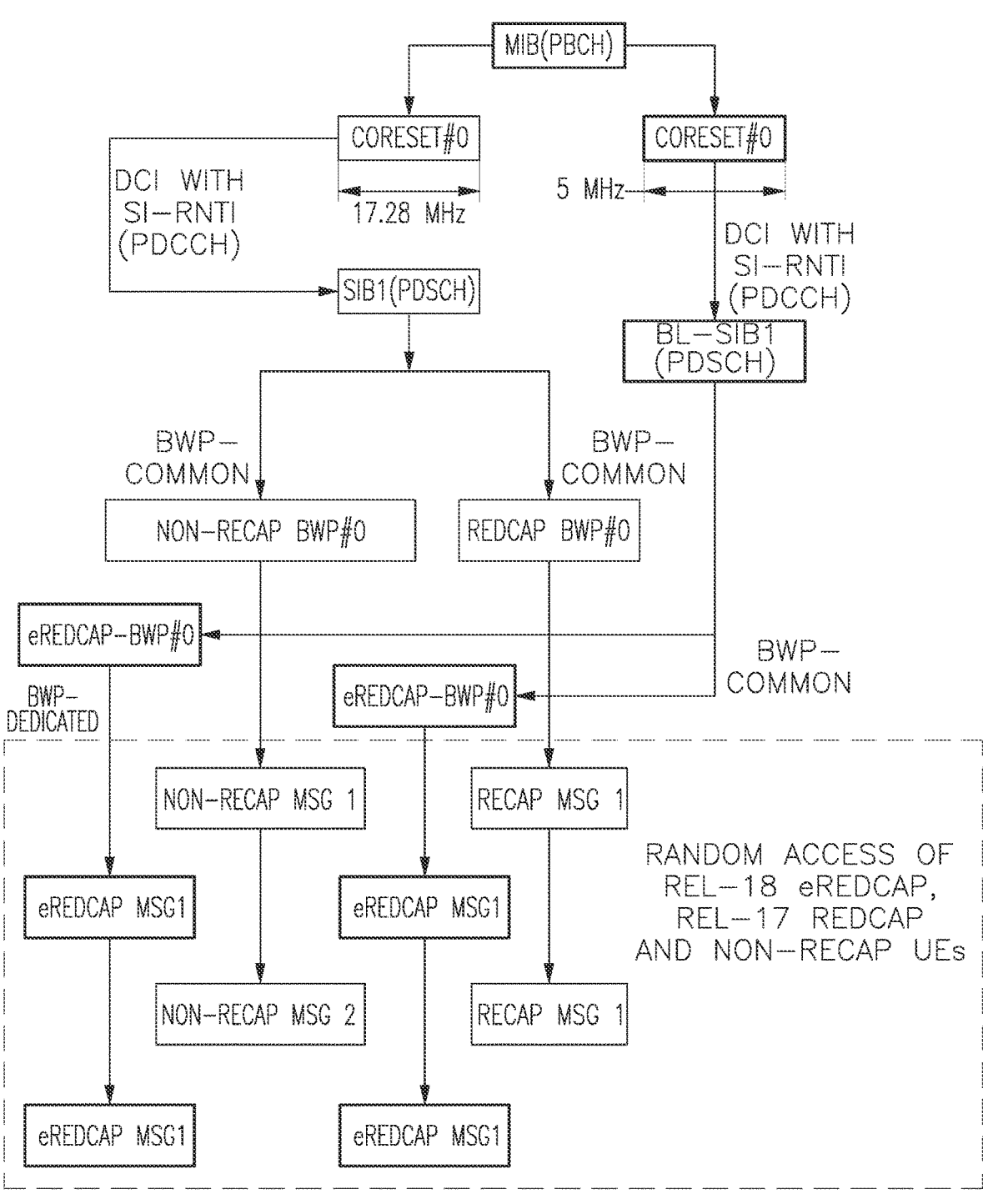
FIG. 12 illustrates a diagram in which initial BWPs for non-redcap UE, Rel-17 RedCap UE, and Rel-18 NB RedCap share the same frequency carrier and overlap with each other in the random access procedure, according to various embodiments of the present disclosure.

In some embodiments, the BWPs for NB RedCap UEs and other UEs may be fully orthogonal to simplify the system design. However, in practice, this may be unlikely because it may result in inefficient usage of the available spectrum. Thus, a focus herein is on a scenario as depicted in FIG. 12 in which initial BWPs for non-redcap UE, Rel-17 RedCap UE, and Rel-18 NB RedCap share the same frequency carrier and overlap with each other in the random access procedure. Thus, solutions may be provided for efficient multiplexing of NB RedCap UEs with other UEs during initial access.

Enhancement of Msg2/RAR for Random Access

In some embodiments, a typical network deployment scenario may include an NB RedCap UEs that share both the DL and UL resources with Rel-17 Redcap UEs and non-Redcap UEs, as depicted in FIG. 12. Also, as described in above, different UE types may be assumed to be configured with a dedicated RO pool to facilitate early indication of UE types to the network. In some cases, there may be ambiguity when a msg2 from the gNB is intended for Rel-17 or Rel-18 Redcap UEs or non-Redcap UE if the CRC of the DCI scheduling msg2 is scrambled with the same RA-RNTI and different UE types share the same CSS type 1 for msg2 reception, e.g., Rel-18 NB RedCap UE and Rel-17 RedCap UE. In this case, because Rel-18 NB Redcap UE and Rel-17 RedCap UE may be configured with different RO pools, the RA-RANTI value for these two types of UEs may be the same if both of the selected ROs in their respective RO pool have the same s_id, t_id and f_id in the different RO pools in which s_id, t_id and f_id may be the parameters used to compute RA-RANTI in legacy NR. If the DCI scheduling message 2 is scrambled with the same RA-RNTI for both NB RedCap UEs and other UEs, and if the NB RedCap UE search space overlaps with the existing search space for other UEs, the PDCCH scheduling Msg2 may be the same (e.g., identical) for NB RedCap UEs and other UEs. Thus, a UE may determine whether this message 2 is intended for this UE or another UE in another initial DL BWP sharing the CSS type 1.

A PDCCH scheduling the msg2 RAR sent from a gNB may be differentiated between NB RedCap UEs and other UEs because the initial DL BWPs may overlap in the frequency and time domain. For example, the initial DL BWP of a non-redcap UE may span the whole carrier BW, which covers the narrow band initial DL BWP for NB RedCap UE as well as the initial DLF BWP of Rel-17 redcap UEs. On the common resources between NB RedCap UEs and other UEs, if the DCIs are the same size, one DCI for a NB RedCap UE may be received (and misinterpreted) by another UE. To solve this issue, several solutions may be considered:

Method 1: Use of different common search spaces type-I in a different CORESET for NB-RedCap UEs: One method may be to configure dedicated type 1 PDCCH CSS resources in a different CORESET for NB RedCap UEs in addition to the type 1 PDCCH CSS and CORESETs for Rel-17 RedCap UEs and non-RedCap UEs. According to one example, the CORESET for type-I PDCCH CSS for non-NB RedCap UEs occupies up to 3 symbols, whereas the corresponding CORESET for NB RedCap UEs may occupy more than 3 symbols to compensate for coverage loss due to the narrower frequency bandwidth than legacy CORESET with dedicated CORESET and type-I CSS search spaces. NB RedCap UE may not decode a DCI for a non-NB RedCap UE, and vice versa.

With this solution, NB RedCap UEs in a separate i DL BWP only monitor these dedicated narrow band type 1 PDCCH CSS resources within this i DL BWP for decoding message 2/RAR broadcast specific for the NB RedCap UEs within this specific i DL BWP. In this case, this specific type 1 PDCCH CSS may be pre-configured in eSIB1 together with this i DL BWP. NB RedCap UE may only be able to decode the type 1 PDCCH CSS resources within its own initial DL BWP. Thus, among multiple narrow band initial DL BWPs, each NB RedCap UE monitors and decodes the type 1 PDCCH CSS resources in its own narrow band initial DL BWP with a separate monitoring window equal to ra-ResponseWindow which may be larger than non-RedCap UEs due to its further relaxed timeline. A gNB sends a separate message 2/RAR in different frequency and time domain resources for PDSCH transmissions in each of the i DL BWPs for NB RedCap UEs. It is the responsibility of the network to schedule different physical resources of PDSCH for each of the message 2/RAR transmissions. Also, the type 1 PDCCH CSS design is specific to Rel-18 NB RedCap UE tailored to narrow BW operation with coverage recovery features, which will be described later. In this sense, even if a gNB sends RAR messages in the same RA RNTI, the RAR messages may be transmitted differently over different PDCCH and PDSCH channel to different UE categories i.e., narrow band NB RedCap UEs or Rel-17 redcap UEs or non-RedCap UEs. To each type of UEs, the operation is transparent to the UE RAR reception and no change to the legacy procedure is involved as long as NB RedCap operates in its own i DL BWP and i UL BWP. One option field to add to RAR may be the confirmation of the selected i UL/DL/ BWP IDs by the NB RedCap UE, after the message 1 transmission.

In some embodiments, a solution may be to always have the NB RedCap specific CORESET configured to occupy more symbols than for other UEs (e.g., set to 4 symbols). In this case, the Resource Element Group (REG)/Control Channel Element (CCE) mapping may be different in the new CORESET, thus ensuring that both the NB redcap UE and other UEs decodes the right DCI with differentiated CORESET configuration.

Method 2: Use of different RA RNTIs for NB RedCap UE and Non-NB RedCap UEs. Alternatively, if no dedicated CORESET and type-I PDCCH CSS is provided to NB RedCap UEs, to avoid an ambiguity of message 2 reception in different initial DL BWPs as mentioned above, the RA-RANTI may be enhanced by considering the initial UL BWP IDs. For example, a NR UE picks a random preamble for RACH procedure to get the uplink synchronization. The preamble is referenced with an ID known as RAPID (Random Access Preamble ID). Random Access RNTI (RA RNTI) is used during Random Access procedure, and the MAC of the gNB generates Random Access Response (RAR) as a response to the Random Access Preamble transmitted by the UE. The RAR is transmitted on DL SCH transport channel, which in turn may be mapped to PDSCH. The gNB scrambles the PDCCH CRC with RA RNTI for transmission of PDSCH that carries RAR(s). RA-RNTI may be addressed to multiple UEs, i.e., multiple UEs may decode PDCCH scrambled by the same. The RA RNTI associated with the PRACH in which the Random Access Preamble that is transmitted may be computed follows:

$$RA\text{-}RNTI = 1 + s\_id + 14 \times t\_id + 14 \times 80 \times f\_id + 14 \times 80 \times 8 \times ul\_carrier\_id + initial\_UL\_BWP\_id, \text{ in which:}$$

s_id: Index of the first OFDM symbol of the specified PRACH ($0 \leq s\_id < 14$)

t_id: Index of the first slot of the specified PRACH in a system frame ($0 \leq t\_id < 80$)

f_id: Index of the specified PRACH in the frequency domain ($0 \leq f\_id < 8$)

ul_carrier_id: Uplink carrier used for Msg1 transmission (0 for NUL carrier, and 1 for SUL carrier)

initial_UL_BWP_id: the initial UL BWP selected by a NB RedCap UE.

According to another solution of message 2 reception for NB Redcap UE, the FDRA of DCI 1_0 for a NB redcap UE may be determined by a selected initial DL BWP by this NB redcap UE or determined by a narrow band CORESET #0 defined for the NB RedCap UE. Thus, assume that NB RedCap UEs and other UEs may have overlapped CSS type 1 search spaces. There may be 2 different sizes of DCI 1_0: DCI 1_0_1 for a regular UE, DCI 1_0_2 for a NB RedCap UE. Even if they use the same formula to determine the RA RNTI, DCI 1_0_1 and DCI 1_0_2 may be of different sizes: because DCI 1_0_2 indexes of FDRA on equal or less than 5 MHz BW, and DCI 1_0_1 indexes of FDRA on a legacy CORESET #0 BW that should be equal or larger than 5 MHz BW. Thus, a NB RedCap UE may differentiate the DCI for other UEs by assuming a different DCI size, even in the overlapped CORESET/search space.

Another solution may be to apply an additional scrambling code on the PDCCH for NB RedCap UEs. This ensures that only NB RedCap UEs may be able to unscramble the DCI. Thus, by simply successfully descrambling the PDCCH, a NB RedCap UE knows that the DCI indicating Msg2 is for a NB RedCap UE.

Msg3 Transmission/Msg4 Reception

Likewise, for msg3 and msg4, a NB RedCap UE may perform similar legacy procedures in the dedicated i UL/DL BWPs. A msg4 may be received via a PDCCH scheduling the msg4+PDCCH carrying a msg4 payload. A NB RedCap UE may monitor for msg4 PDCCH in the dedicated type I PDCCH CSS in a dedicated CORESET in its i DL BWP, during a monitoring window equal to ra ContentionResolutionTimer. The PDCCH may be scrambled by the TC RNTI received in the previous msg2. The contention may be resolved by as follows. When an NB RedCap UE receives a valid RAR message within its monitored i DL BWP, it may include a Contention Resolution ID (CRID) that it randomly generates independently by each of the all types of UEs. A gNB may includes only one of the received CRID values in msg4. An NB RedCap UE that receives its CRID value knows it has successfully completed its RA procedure. Other UEs may reattempt their RA procedures by reselecting the i DL/UL BWPs. This involves a new UE behavior not currently defined by 3GPP.

The iBWP reselection process may be performed as follows: A UE may receive a value for max_CRID_failures. This value indicates the number of consecutive times a UE may receive a Msg4 with a CRID value not corresponding to what the UE had sent in Msg3. Alternatively, instead of being consecutive, a counter similar to what is done for link failure may be employed. The max_CRID_failures may be received in a RRC message, may be pre-configured, etc. The UE performs initial steps of initial access as previously described. The UE receives a Msg4. If the CRID does not correspond to the value that the UE was expecting, and if it reaches max_CRID_failure value, then the UE performs iBWP reselection. This may be done in several ways. The UE may randomly select a different iBWP, and the UE may be provided with a list of alternate iBWPs, etc. If the CRID does not correspond to the value the UE was expecting, and if it does not reach the max_CRID_failure value, then the UE performs another attempt at initial access (starting from Msg1). If a UE receives the expected CRID value, the UE then moves to the next step of initial access (sometimes referred to as Msg5), to obtain the RRC connection, message, the capability exchange, etc. The overall process is shown according to an embodiment illustrated in FIG. 13.

Search Space Definition for NB RedCap UEs

In some embodiments, an aspect explores a design of a narrowband PDCCH with coverage compensations for both common CORESET CSS and UE specific CORESET USS. It may be designed with following options:

Option 1: Longer duration CORESET.

Option 2: CORESET bundling.

Option 3: PDCCH repetition.

Figure 14:
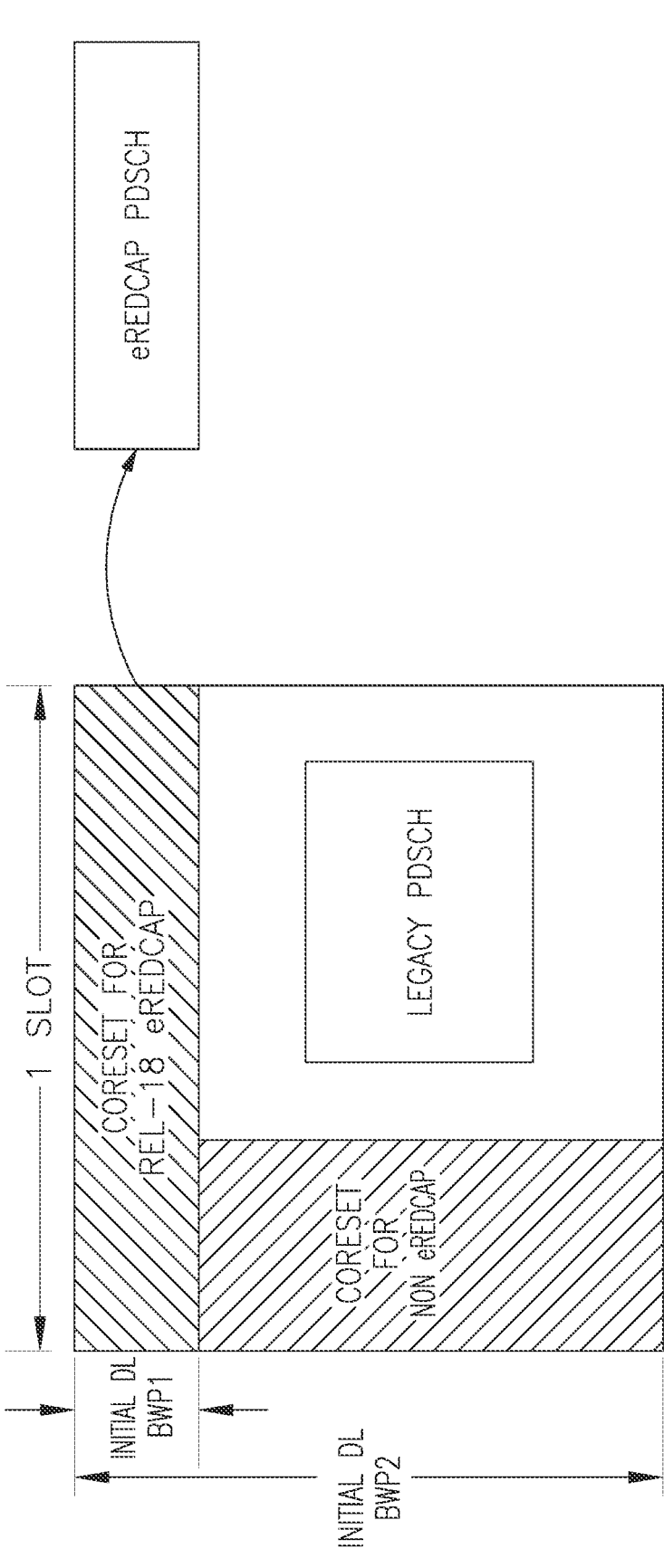

The first way may be to increase the number of CCEs in one slot, for example, configuring more symbols for CORESET, as shown in FIG. 14. For example, a 12-symbol length CORESET may be configured for one CORESET within one slot, and PDSCH and the associated DMRS may be transmitted at the seventh symbol of the current slot or in the later slots. The new resource mapping criterion may be designed if a longer CORESET duration is introduced. There may be resource collisions due to the different CCE mapping rules if CORESET for RedCap UEs and that for normal UEs may be configured with overlapping resources.

Figure 15:
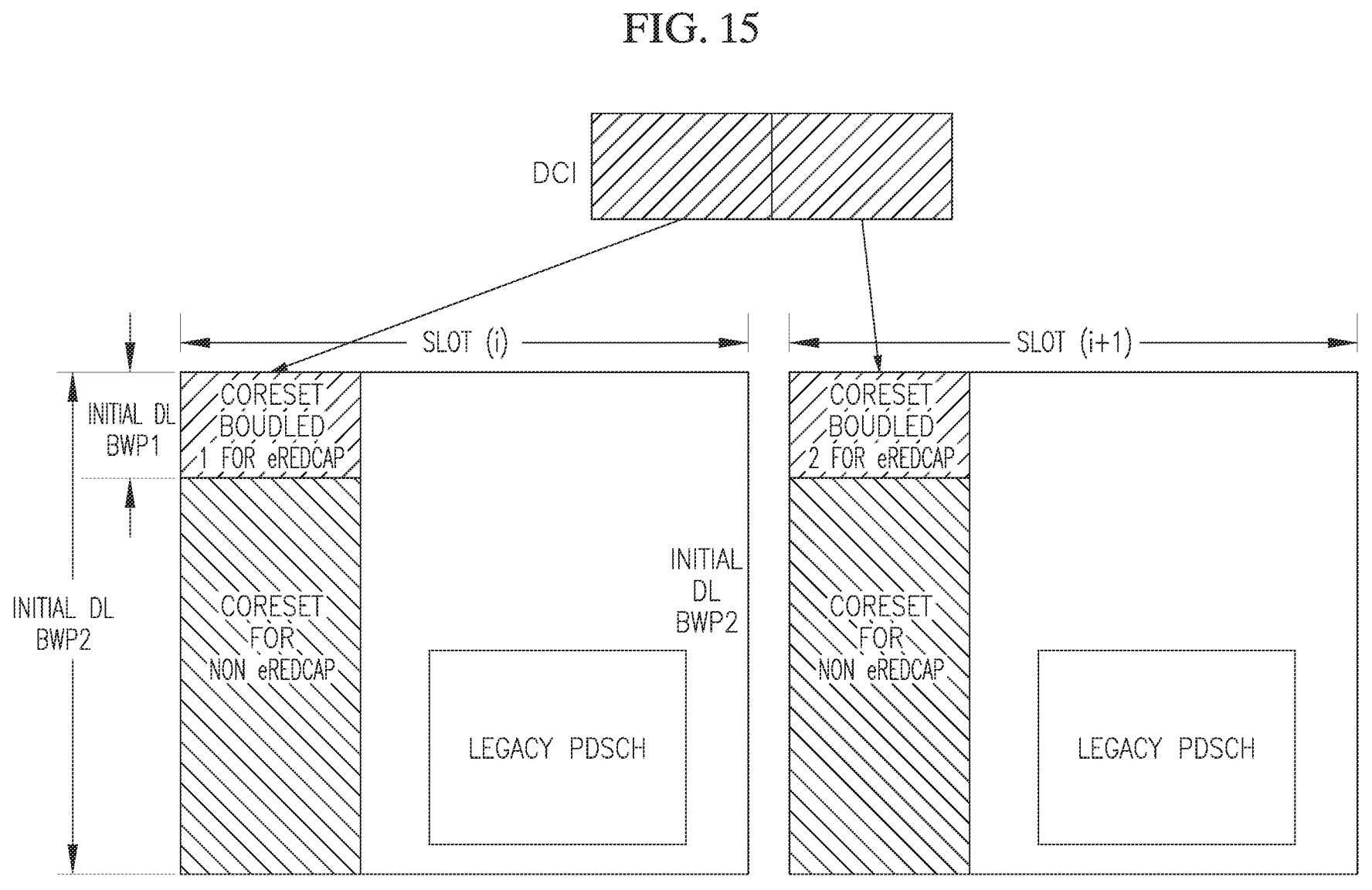

CORESET bundling may be another scheme to increase the CCE number for PDCCH transmission. Two or more CORESETs at different time occasions may be configured to be bundled, as shown in FIG. 15. The bundled CORESETs may be transmitted in the same slot or several different slots. An encoded DCI may be split into several parts and mapped to the bundled CORESETs, respectively. An NB RedCap UE may collect the desired CCEs from the bundled CORESETs according to a predefined or configured CCE mapping rule before DCI decoding. CORESET bundling may not change the resource mapping within CORESET, therefore DCI for NB RedCap UE may coexist with legacy DCI in the same CORESET without resource collision. There may be a larger transmit latency due to CCE distributing across multiple CORESETs, but it may be acceptable for NB RedCap UE.

Figure 16:
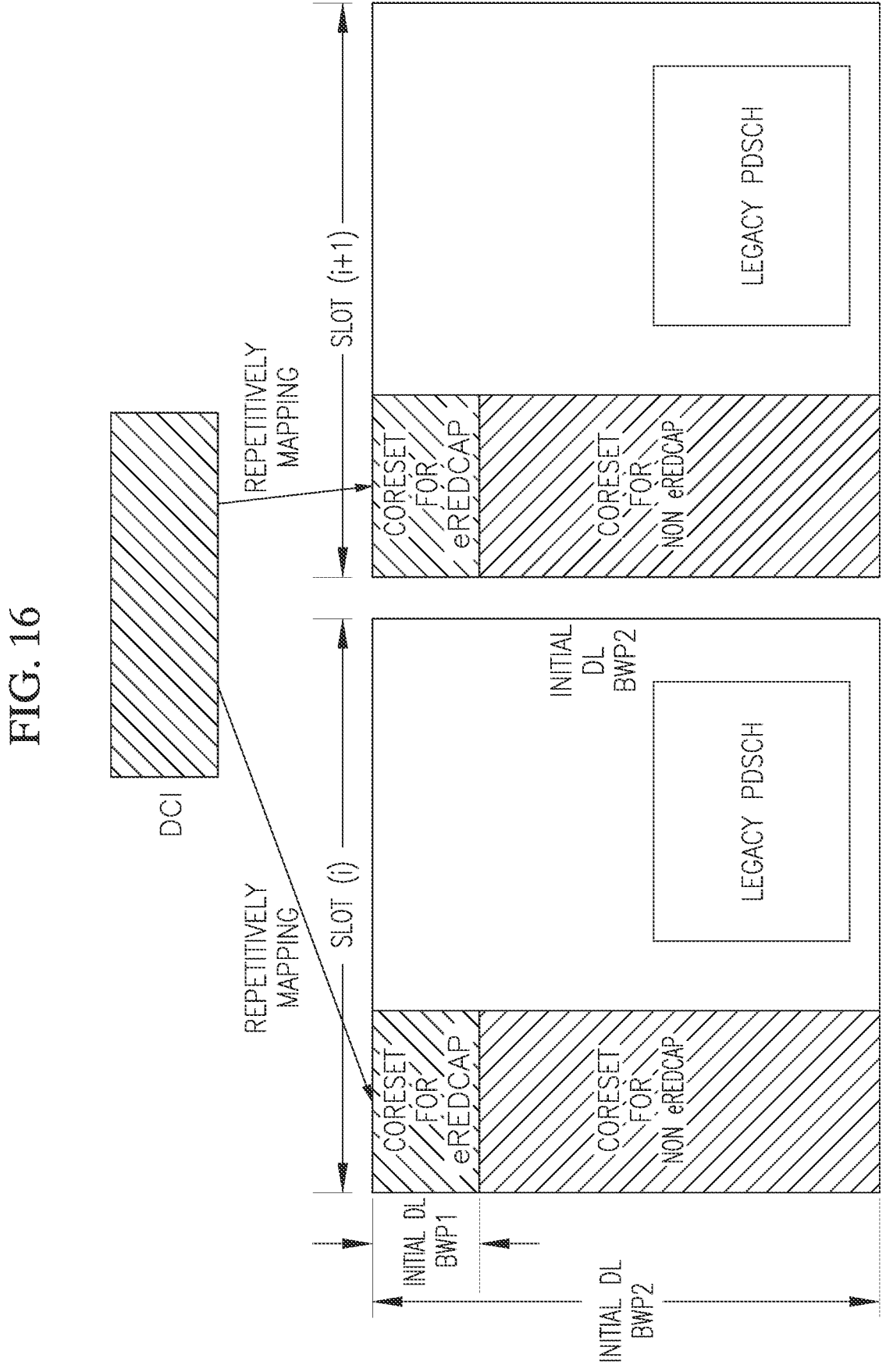

As shown in FIG. 16, PDCCH repetition may increase PDCCH reliability without changing the CORESET configurations defined in Rel-15/Rel-16. For inter-slot PDCCH repetition, a DCI may be repetitively transmitted in several CORESETs in the continuous slots. For intra-slot PDCCH repetition, a DCI may be repetitively transmitted in several CORESETs within a slot. An NB RedCap UE may combine the received signals of these CORESETs to further increase the detection reliability. PDCCH repetition may increase the complexity and latency of DCI receiving, and DCI content need to be consistent during the repetition if soft combining is required. Alternatively, PDCCH without combining may also be considered, and performance improvement may be achieved by accumulated probability along with the times of decoding attempts.

FIG. 17 is a flow chart illustrating an initial access process in which a UE obtains and decodes the PBCH. As already explained above, an SS/PBCH broadcast from a network such as a gNB is received by the RedCap UE (1702). However, different from a legacy UE, the RedCap UE is bandwidth-limited and therefore may not be able to acquire portions of the SS/PBCH broadcast signal that fall outside of the bandwidth range (e.g., maximum bandwidth) of the RedCap UE. Accordingly, a first SS/PBCH block comprises a PSS, an SSS, and a PBCH, and wherein a subcarrier spacing (SCS) and a number of subcarriers used by the first SS/PBCH block is selected such that a PBCH bandwidth is less than a maximum bandwidth of the RedCap UE. More particularly, and different from a legacy PBCH, a RedCap PBCH may be structured such that the PSS, SSS, and the PBCH bits all fall within the maximum bandwidth of the RedCap UE. This structure was illustrated in FIG. 6 where SCS and the number of subcarriers used the by SS/PBCH block is limited to the central portion of the SS/PBCH block corresponding to the maximum bandwidth of the RedCap UE. For example, for a RedCap UE with a maximum bandwidth of 5 MHz, the central 12 PRBs and 127 subcarriers may be utilized. However, it should be noted that depending on the maximum bandwidth of the RedCap UE, the number of PRBs may be more or less. Next, the RedCap UE may decode the received SS/PBCH to proceed with the initial access process (1704).

In some embodiments, the RedCap UE may receive a second SS/PBCH block different from the first SS/PBCH block. For example, the second SS/PBCH block may occupy the maximum bandwidth range of a legacy UE (e.g., 100 MHz). Thus, a RedCap UE may not be able to utilize it. However, first SS/PBCH block and the second SS/PBCH block may be broadcast at different frequency locations. Therefore, while the RedCap UE may receive or recognize the presence of the second SS/PBCH block, the RedCap UE may ignore the second SS/PBCH block and instead utilize the first SS/PBCH block. Accordingly, a network server may be configured to broadcast SS/PBCH that supports both legacy and bandwidth-limited UEs such as RedCap UEs, and the UEs may automatically select and decode the SS/PBCH that is suitable based on its capabilities, and proceed with the initial access procedure.

Figures 18, 19:
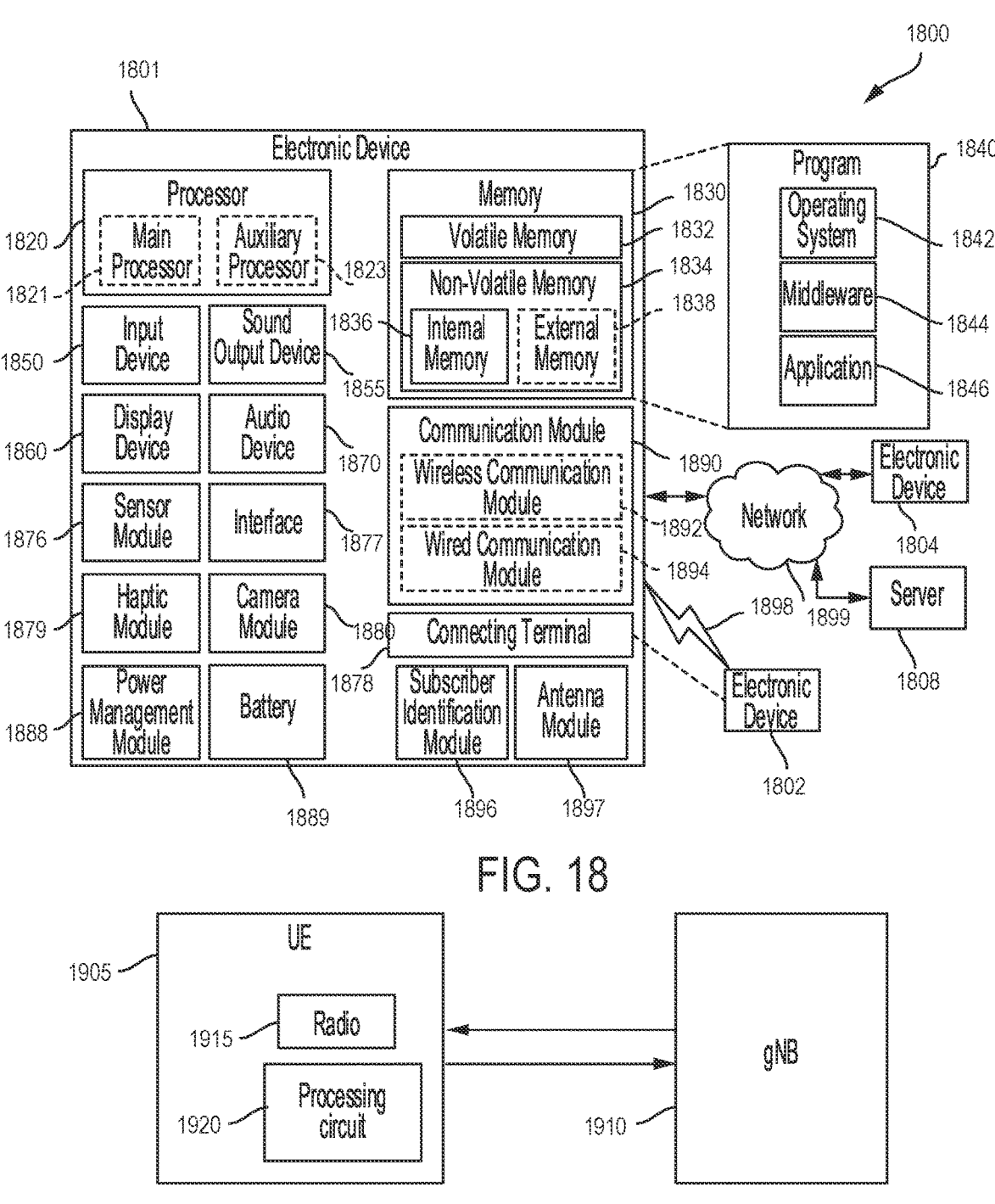
FIGS. 18-19 are block diagrams of an electronic device in a network environment, according to an embodiment.

FIG. 18 is a block diagram of an electronic device in a network environment 1800, according to an embodiment.

Referring to FIG. 18, an electronic device 1801 in a network environment 1800 may communicate with an electronic device 1802 via a first network 1898 (e.g., a short-range wireless communication network), or an electronic device 1804 or a server 1808 via a second network 1899 (e.g., a long-range wireless communication network). The electronic device 1801 may communicate with the electronic device 1804 via the server 1808. The electronic device 1801 may include a processor 1820, a memory 1830, an input device 1840, a sound output device 1855, a display device 1860, an audio module 1870, a sensor module 1876, an interface 1877, a haptic module 1879, a camera module 1880, a power management module 1888, a battery 1889, a communication module 1890, a subscriber identification module (SIM) card 1896, or an antenna module 1894. In one embodiment, at least one (e.g., the display device 1860 or the camera module 1880) of the components may be omitted from the electronic device 1801, or one or more other components may be added to the electronic device 1801. Some of the components may be implemented as a single integrated circuit (IC). For example, the sensor module 1876 (e.g., a fingerprint sensor, an iris sensor, or an illuminance sensor) may be embedded in the display device 1860 (e.g., a display).

The processor 1820 may execute software (e.g., a program 1840) to control at least one other component (e.g., a hardware or a software component) of the electronic device 1801 coupled with the processor 1820 and may perform various data processing or computations.

As at least part of the data processing or computations, the processor 1820 may load a command or data received from another component (e.g., the sensor module 1846 or the communication module 1890) in volatile memory 1832, process the command or the data stored in the volatile memory 1832, and store resulting data in non-volatile memory 1834. The processor 1820 may include a main processor 1821 (e.g., a central processing unit (CPU) or an application processor (AP)), and an auxiliary processor 1823 (e.g., a graphics processing unit (GPU), an image signal processor (ISP), a sensor hub processor, or a communication processor (CP)) that is operable independently from, or in conjunction with, the main processor 1821. Additionally or alternatively, the auxiliary processor 1823 may be adapted to consume less power than the main processor 1821, or execute a particular function. The auxiliary processor 1823 may be implemented as being separate from, or a part of, the main processor 1821.

The auxiliary processor 1823 may control at least some of the functions or states related to at least one component (e.g., the display device 1860, the sensor module 1876, or the communication module 1890) among the components of the electronic device 1801, instead of the main processor 1821 while the main processor 1821 is in an inactive (e.g., sleep) state, or together with the main processor 1821 while the main processor 1821 is in an active state (e.g., executing an application). The auxiliary processor 1823 (e.g., an image signal processor or a communication processor) may be implemented as part of another component (e.g., the camera module 1880 or the communication module 1890) functionally related to the auxiliary processor 1823.

The memory 1830 may store various data used by at least one component (e.g., the processor 1820 or the sensor module 1876) of the electronic device 1801. The various data may include, for example, software (e.g., the program 1840) and input data or output data for a command related thereto. The memory 1830 may include the volatile memory 1832 or the non-volatile memory 1834.

The program 1840 may be stored in the memory 1830 as software, and may include, for example, an operating system (OS) 1842, middleware 1844, or an application 1846.

The input device 1850 may receive a command or data to be used by another component (e.g., the processor 1820) of the electronic device 1801, from the outside (e.g., a user) of the electronic device 1801. The input device 1850 may include, for example, a microphone, a mouse, or a keyboard.

The sound output device 1855 may output sound signals to the outside of the electronic device 1801. The sound output device 1855 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 1860 may visually provide information to the outside (e.g., a user) of the electronic device 1801. The display device 1860 may include, for example, a display, a hologram device, or a projector and control circuitry to control a corresponding one of the display, hologram device, and projector. The display device 1860 may include touch circuitry adapted to detect a touch, or sensor circuitry (e.g., a pressure sensor) adapted to measure the intensity of force incurred by the touch.

The audio module 1870 may convert a sound into an electrical signal and vice versa. The audio module 1870 may obtain the sound via the input device 1850 or output the sound via the sound output device 1855 or a headphone of an external electronic device 1802 directly (e.g., wired) or wirelessly coupled with the electronic device 1801.

The sensor module 1876 may detect an operational state (e.g., power or temperature) of the electronic device 1801 or an environmental state (e.g., a state of a user) external to the electronic device 1801, and then generate an electrical signal or data value corresponding to the detected state. The sensor module 1876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1877 may support one or more specified protocols to be used for the electronic device 1801 to be coupled with the external electronic device 1802 directly (e.g., wired) or wirelessly. The interface 1877 may include, for example, a high-definition multimedia interface (HDMI), a universal serial bus (USB) interface, a secure digital (SD) card interface, or an audio interface.

A connecting terminal 1878 may include a connector via which the electronic device 1801 may be physically connected with the external electronic device 1802. The connecting terminal 1878 may include, for example, an HDMI connector, a USB connector, an SD card connector, or an audio connector (e.g., a headphone connector).

The haptic module 1879 may convert an electrical signal into a mechanical stimulus (e.g., a vibration or a movement) or an electrical stimulus which may be recognized by a user via tactile sensation or kinesthetic sensation. The haptic module 1879 may include, for example, a motor, a piezoelectric element, or an electrical stimulator.

The camera module 1880 may capture a still image or moving images. The camera module 1880 may include one or more lenses, image sensors, image signal processors, or flashes. The power management module 1888 may manage power supplied to the electronic device 1801. The power management module 1888 may be implemented as at least part of, for example, a power management integrated circuit (PMIC).

The battery 1889 may supply power to at least one component of the electronic device 1801. The battery 1889 may include, for example, a primary cell which is not rechargeable, a secondary cell which is rechargeable, or a fuel cell.

The communication module 1890 may support establishing a direct (e.g., wired) communication channel or a wireless communication channel between the electronic device 1801 and the external electronic device (e.g., the electronic device 1802, the electronic device 1804, or the server 1808) and performing communication via the established communication channel. The communication module 1890 may include one or more communication processors that are operable independently from the processor 1820 (e.g., the AP) and supports a direct (e.g., wired) communication or a wireless communication. The communication module 1890 may include a wireless communication module 1892 (e.g., a cellular communication module, a short-range wireless communication module, or a global navigation satellite system (GNSS) communication module) or a wired communication module 1894 (e.g., a local area network (LAN) communication module or a power line communication (PLC) module). A corresponding one of these communication modules may communicate with the external electronic device via the first network 1898 (e.g., a short-range communication network, such as Bluetooth™, wireless-fidelity (Wi-Fi) direct, or a standard of the Infrared Data Association (IrDA)) or the second network 1899 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 1892 may identify and authenticate the electronic device 1801 in a communication network, such as the first network 1898 or the second network 1899, using subscriber information (e.g., international mobile subscriber identity (IMSI)) stored in the subscriber identification module 1896.

The antenna module 1897 may transmit or receive a signal or power to or from the outside (e.g., the external electronic device) of the electronic device 1801. The antenna module 1897 may include one or more antennas, and, therefrom, at least one antenna appropriate for a communication scheme used in the communication network, such as the first network 1898 or the second network 1899, may be selected, for example, by the communication module 1890 (e.g., the wireless communication module 1892). The signal or the power may then be transmitted or received between the communication module 1890 and the external electronic device via the selected at least one antenna.

Commands or data may be transmitted or received between the electronic device 1801 and the external electronic device 1804 via the server 1808 coupled with the second network 1899. Each of the electronic devices 1802 and 1804 may be a device of a same type as, or a different type, from the electronic device 1801. All or some of operations to be executed at the electronic device 1801 may be executed at one or more of the external electronic devices 1802, 1804, or 1808. For example, if the electronic device 1801 should perform a function or a service automatically, or in response to a request from a user or another device, the electronic device 1801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 1801. The electronic device 1801 may provide the outcome, with or without further processing of the outcome, as at least part of a reply to the request. To that end, a cloud computing, distributed computing, or client-server computing technology may be used, for example.

FIG. 19 shows a system including a UE 1905 and a gNB 1910, in communication with each other. The UE may include a radio 1915 and a processing circuit (or a means for processing) 1920, which may perform various methods disclosed herein. For example, the processing circuit 1820 may receive, via the radio 1915, transmissions from the network node (gNB) 1910, and the processing circuit 1920 may transmit, via the radio 1915, signals to the gNB 1910.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

ABBREVIATIONS LIST

| Abbreviation | Definition |
| --- | --- |
| BWP | BandWidth Part |
| iBWP | Initial BWP |
| RA-RNTI | Random Access Radio Network Temporary Identified |
| CCE | Control Channel Element |
| CORESET | Control Resource Set |
| CRC | Cyclic Redundancy Check |
| C-RNTI | Cell-Radio Network Temporary Identifier |
| DCI | Downlink Control Information |
| DL | Downlink |
| RO | Random Access Occasions |
| FDRA | Frequency Domain Resource Assignment |
| gNB | Next Generation NodeB |
| CSS | Common Search Space |
| MCS | Modulation Coding Scheme |
| CRID | Contention Resolution ID |
| RAR | Random Access Response |
| REG | Resource Element Group |
| PBCH | Physical Broadcast Channel |
| SSB | Synchronization Signal Block |

What is claimed is:

1. A method, comprising:
receiving, by a reduced capabilities (RedCap) user equipment (UE), a first synchronization signal (SS)/physical broadcast channel (PBCH) block from a network;
wherein the first SS/PBCH block comprises a primary synchronization signal (PSS), a secondary synchronization signal (SSS), and a physical broadcast channel (PBCH);
wherein a subcarrier spacing (SCS) and a number of subcarriers used by the first SS/PBCH block correspond to a PBCH bandwidth that is less than a maximum bandwidth of the RedCap UE; and
decoding, by the RedCap UE, the received first SS/PBCH corresponding to the maximum bandwidth of the RedCap UE.

2. The method of claim 1, further comprising receiving, by the RedCap UE, a second SS/PBCH block different from the first SS/PBCH block, the maximum bandwidth of the second SS/PBCH block being greater than the maximum bandwidth of the first SS/PBCH block.

3. The method of claim 2, wherein the first SS/PBCH block is received at a first frequency location and the second SS/PBCH block is received at a second frequency location different from the first frequency location.

4. The method of claim 2, wherein the first SS/PBCH block is configured to operate over four symbols, and the PSS occupies a first symbol of the four symbols, the SSS occupies a third symbol of the four symbols, and the PBCH occupies second and fourth symbols of the four symbols.

5. The method of claim 1, wherein the first SS/PBCH block occupies less than 5 MHz of bandwidth.

6. A method, comprising:
receiving, by a reduced capabilities (RedCap) user equipment (UE), a synchronization signal (SS)/physical broadcast channel (PBCH) block from a network;
wherein the SS/PBCH block comprises a primary synchronization signal (PSS), a secondary synchronization signal (SSS), a first set of physical broadcast channels (PBCH), a second set of PBCH, and a third set of PBCH;
wherein the third set of PBCH is a duplicate of the second set of PBCH; and
decoding, by the RedCap UE, the PSS, the SSS, the first set of PBCH, and the third set of PBCH.

7. The method of claim 6, wherein the SS/PBCH block is configured to operate over six symbols,
wherein the PSS occupies a first symbol of the six symbols, the SSS occupies a third symbol of the six symbols, and the first and second sets of PBCH occupies the second, third, and fourth symbols of the six symbols, and the third set of PBCH occupies the fifth and sixth symbols of the six symbols.

8. The method of claim 7, wherein at least a portion of the SS/PBCH block comprising the PSS, the SSS, and the first and second sets of PBCH supports a legacy UE, and at least a portion of the SS/PBCH block comprising the PSS, the SSS, and the first and third sets of PBCH supports the RedCap UE.

9. The method of claim 7, further comprising:
receiving, by the RedCap UE, a legacy control resource set (CORESET #0) and a legacy system information block (SIB1) multiplexed with a narrowband CORESET #0 and a narrowband SIB1; and
decoding, by the RedCap UE, the narrowband CORESET #0 and the narrowband SIB1.

10. The method of claim 9, further comprising:
receiving, by the RedCap UE, a plurality of bandwidth parts (BWPs);
selecting, by the RedCap UE, one BWP of the plurality of BWPs based on a criteria defined in the SIB1; and
sending, by the RedCap UE, a first message during a random access procedure, to the network.

11. The method of claim 10, wherein the criteria is based on evenly balancing traffic load across the plurality of BWPs.

12. The method of claim 7, wherein a maximum bandwidth of the RedCap UE is 5 MHZ, at least a portion of the received SS/PBCH corresponding to the maximum bandwidth of the RedCap UE.

13. The method of claim 7, further comprising rearranging bits for the third set of PBCH to an order corresponding to bits for the second set of PBCH, and decoding the bits for the first and third sets of PBCH,
wherein the SS/PBCH block is received in a synchronization signal burst set during an initial access, and the RedCap UE receives the PSS, the SSS, and bits for the first and third sets of PBCH.

14. A system comprising:
a reduced capability (RedCap) user equipment (UE) comprising:
a memory; and a processor configured to execute instructions stored in the memory to perform operations comprising:

receiving, by the RedCap UE, a synchronization signal (SS)/physical broadcast channel (PBCH) block from a network;

wherein the SS/PBCH block comprises a primary synchronization signal (PSS), a secondary synchronization signal (SSS), a first set of physical broadcast channels (PBCH), a second set of PBCH, and a third set of PBCH;

wherein the third set of PBCH is a duplicate of the second set of PBCH; and decoding, by the RedCap UE, the PSS, the SSS, the first set of PBCH, and the third set of PBCH.

15. The system of claim 14, wherein the SS/PBCH block is configured to operate over six symbols, wherein the PSS occupies a first symbol of the six symbols, the SSS occupies a third symbol of the six symbols, and the first and second sets of PBCH occupies the second, third, and fourth symbols of the six symbols, and the third set of PBCH occupies the fifth and sixth symbols of the six symbols.

16. The system of claim 15, wherein at least a portion of the SS/PBCH block comprising the PSS, the SSS, and the first and second sets of PBCH supports a legacy UE, and at least a portion of the SS/PBCH block comprising the PSS, the SSS, and the first and third sets of PBCH supports the RedCap UE.

17. The system of claim 15, wherein the operations further comprise:

receiving, by the RedCap UE, a legacy control resource set (CORESET #0) and a legacy system information block (SIB1) multiplexed with a narrowband CORESET #0 and a narrowband SIB1; and decoding, by the RedCap UE, the narrowband CORESET #0 and the narrowband SIB1.

18. The system of claim 17, wherein the operations further comprise:

receiving, by the RedCap UE, a plurality of bandwidth parts (BWPs);

selecting, by the RedCap UE, one BWP of the plurality of BWPs based on a criteria defined in the SIB1; and sending, by the RedCap UE, a first message during a random access procedure, to the network.

19. The system of claim 18, wherein the criteria is based on evenly balancing traffic load across the plurality of BWPs.

20. The system of claim 15, wherein a maximum bandwidth of the RedCap UE is 5 MHZ, at least a portion of the received SS/PBCH corresponding to the maximum bandwidth of the RedCap UE.

21. The system of claim 15, wherein the operations further comprise rearranging bits for the third set of PBCH to an order corresponding to bits for the second set of PBCH, and decoding the bits for the first and third sets of PBCH, wherein the SS/PBCH block is received in a synchronization signal burst set during an initial access, and the RedCap UE receives the PSS, the SSS, and bits for the first and third sets of PBCH.

* * * * *